(12) United States Patent
Forutanpour et al.

(10) Patent No.: US 11,182,972 B2
(45) Date of Patent: Nov. 23, 2021

(54) VIRTUAL TELEPORTATION IN FIXED ENVIRONMENTS

(71) Applicant: Qualcomm Incorporated, San Diego, CA (US)

(72) Inventors: Bijan Forutanpour, San Diego, CA (US); Shankar Thagadur Shivappa, San Diego, CA (US); Phi Hung Nguyen, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/720,551

(22) Filed: Dec. 19, 2019

(65) Prior Publication Data

US 2020/0258306 A1 Aug. 13, 2020

Related U.S. Application Data

(60) Provisional application No. 62/804,657, filed on Feb. 12, 2019.

(51) Int. Cl.
| | | |
|---|---|---|
| *G06T 19/00* | (2011.01) |
| *G06T 11/00* | (2006.01) |
| *G06T 9/00* | (2006.01) |
| *H04R 5/02* | (2006.01) |
| *H04S 7/00* | (2006.01) |
| *H04W 4/40* | (2018.01) |

(Continued)

(52) U.S. Cl.
CPC ............. *G06T 19/006* (2013.01); *G06T 9/00* (2013.01); *G06T 11/00* (2013.01); *H04R 5/02* (2013.01); *H04S 7/303* (2013.01); *H04W 4/40*

(2018.02); *G01S 19/51* (2013.01); *G02B 27/0101* (2013.01); *G02B 2027/014* (2013.01); *H04S 2400/11* (2013.01)

(58) Field of Classification Search
None
See application file for complete search history.

(56) References Cited

U.S. PATENT DOCUMENTS

| | | | | |
|---|---|---|---|---|
| 2008/0263458 A1* | 10/2008 | Altberg | .............. | G06Q 30/0241 715/757 |
| 2014/0215389 A1* | 7/2014 | Walsh | ................... | G06F 3/0488 715/808 |
| 2017/0048592 A1 | 2/2017 | Branch et al. | | |

(Continued)

OTHER PUBLICATIONS

International Search Report and Written Opinion—PCT/US2019/068066—ISA/EPO—dated Mar. 24, 2020.

*Primary Examiner* — Tize Ma
(74) *Attorney, Agent, or Firm* — Espartaco Diaz Hidalgo

(57) ABSTRACT

The techniques disclosed herein include a first device for receiving a communication signal from a second device, the first device including one or more processors configured to receive, in the communication signal, packets that represent a virtual image as part of a virtual teleportation of one or more visual objects embedded in the virtual image. The one or more processors may be configured to decode the packets that represent the virtual image, and output the virtual image at a physical location within a fixed environment. The first device may also include a memory configured to store the packets that represent the virtual image as part of the virtual teleportation of one or more visual objects embedded in the virtual image.

29 Claims, 19 Drawing Sheets

(51) Int. Cl.
  *G01S 19/51* (2010.01)
  *G02B 27/01* (2006.01)

(56) References Cited

U.S. PATENT DOCUMENTS

| | | |
|---|---|---|
| 2019/0018364 A1 | 1/2019 | Kim |
| 2019/0361233 A1* | 11/2019 | Ogawa ..................... G09G 5/10 |
| 2020/0074735 A1* | 3/2020 | Nowakowski ............ B60R 1/00 |
| 2020/0098188 A1* | 3/2020 | Bar-Zeev .............. G06T 19/006 |

* cited by examiner

200 ⟶

210
Receive, in the communication signal, packets that represent a virtual image as part of a virtual teleportation of one or more visual objects embedded in the virtual image.

215
Store the packets that represent the virtual image as part of the virtual teleportation of one or more visual objects embedded in the virtual image.

220
Decode the packets that represent the virtual image.

230
Output the virtual image at a physical location within a fixed environment.

FIG. 2

VIRTUAL TELEPORTATION IN FIXED ENVIRONMENTS

CLAIMS OF PRIORITY UNDER 35 U.S.C. § 119

The present application for patent claims priority to Provisional Application No. 62/804,657 entitled "VIRTUAL TELEPORTATION IN FIXED ENVIRONMENTS" filed Feb. 12, 2019, and assigned to the assignee hereof and hereby expressly incorporated by reference herein.

TECHNICAL FIELD

This application is related to virtual teleportation in fixed environments.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long-Term Evolution (LTE) system, or a New Radio (NR) system).

A wireless multiple-access communications system may include a number of base stations or access network nodes, each simultaneously supporting communication for multiple communication devices, which may be otherwise known as user equipment (UE). In addition, wireless communication systems may include support networks used for vehicle-based communications. For example, vehicle-to-vehicle (V2V) and vehicle-to-infrastructure (V2I) communication are wireless technologies that enable exchange of data between a vehicle and its surroundings. Collectively, V2V and V2I is referred to as vehicle-to-everything (V2X). V2X uses a communications wireless link for fast-moving objects, e.g., like vehicles. Recently, V2X communications cellular V2X (C-V2X) has emerged to differentiate it from the WLAN based V2X.

The 5G Automotive Association (5GAA) has promoted C-V2X. C-V2X was initially defined in LTE Release 14 and was designed to operate in several modes: (a) Device-to-device (V2V); (b) Device-to-cell-tower (V2I); and (c) device-to-network (V2N). In 3GPP Release 15, C-V2X includes support for both V2V and traditional cellular-network based communication, and the functionality was expanded to support the 5G air interface standard. The PC5 interface in C-V2X allows for direct communication (via a "sidelink channel") between a vehicle and other devices without the use of a base station.

Vehicle based communication networks may provide always-on telematics where UEs, such as vehicle UEs (v-UEs), communicate directly to the network (V2N), to pedestrian UEs (V2P), to infrastructure devices (V2I), and to other v-UEs (e.g., via the network). The vehicle-based communication networks may support a safe, always-connected driving experience by providing intelligent connectivity where traffic signal/timing, real-time traffic and routing, safety alerts to pedestrians/bicyclist, collision avoidance information, etc., are exchanged.

Such network supporting vehicle-based communications, however, may also be associated with various requirements, e.g., communication requirements, security and privacy requirements, etc. Other example requirements may include, but are not limited to, reduced latency requirements, higher reliability requirements, and the like. For example, vehicle-based communications may include communicating sensor data that may support self-driving cars. Sensor data may also be used between vehicles to improve the safety of self-driving cars.

V2X and C-V2X allow for diverse applications to emerge including the ones described in this disclosure.

SUMMARY

In general, this disclosure describes techniques related to virtual teleportation in fixed environments.

In one example, the disclosure describes a first device for receiving a communication signal from a second device, the first device including one or more processors configured to receive, in the communication signal, packets that represent a virtual image as part of a virtual teleportation of one or more visual objects embedded in the virtual image. The one or more processors may be configured to decode the packets that represent the virtual image, and output the virtual image at a physical location within a fixed environment. The first device may also include a memory configured to store the packets that represent the virtual image as part of the virtual teleportation of one or more visual objects embedded in the virtual image.

In one example, the disclosure describes a method for receiving, at a first device, a communication signal from a second device, the method includes receiving, in the communication signal, packets that represent a virtual image as part of a virtual teleportation of one or more visual objects embedded in the virtual image, and storing the packets that represent the virtual image as part of the virtual teleportation of one or more visual objects embedded in the virtual image. The method may also include decoding the packets that represent the virtual image, and outputting the virtual image at a physical location within a fixed environment.

In one example, the disclosure describes an for receiving, at a first device, a communication signal from a second device, the apparatus including means for receiving, in the communication signal, packets that represent a virtual image as part of a virtual teleportation of one or more visual objects embedded in the virtual image, and means for storing the packets that represent the virtual image as part of the virtual teleportation of one or more visual objects embedded in the virtual image. The apparatus may also include means for decoding the packets that represent the virtual image, and means for outputting the virtual image at a physical location within a fixed environment.

In one example, the disclosure describes a non-transitory computer readable storage medium having stored thereon instructions that, when executed, cause one or more processors of a first device to receive, in the communication signal, packets that represent a virtual image as part of a virtual teleportation of one or more visual objects embedded in the virtual image, and store the packets that represent the virtual image as part of the virtual teleportation of one or more visual objects embedded in the virtual image. The instructions when executed may cause one or more processors to decode the packets that represent the virtual image, and output the virtual image at a physical location within a fixed environment.

The details of one or more examples of this disclosure are set forth in the accompanying drawings and the description below. Other features, objects, and advantages of various aspects of the techniques will be apparent from the description and drawings, and from the claims.

BRIEF DESCRIPTION OF DRAWINGS

FIG. 2 illustrates a flowchart of a process of a first device receiving packets that represent a virtual image as part of a virtual teleportation of one or more visual objects embedded in the virtual image communication based on the techniques described in this disclosure.

DETAILED DESCRIPTION

Figure 1A:
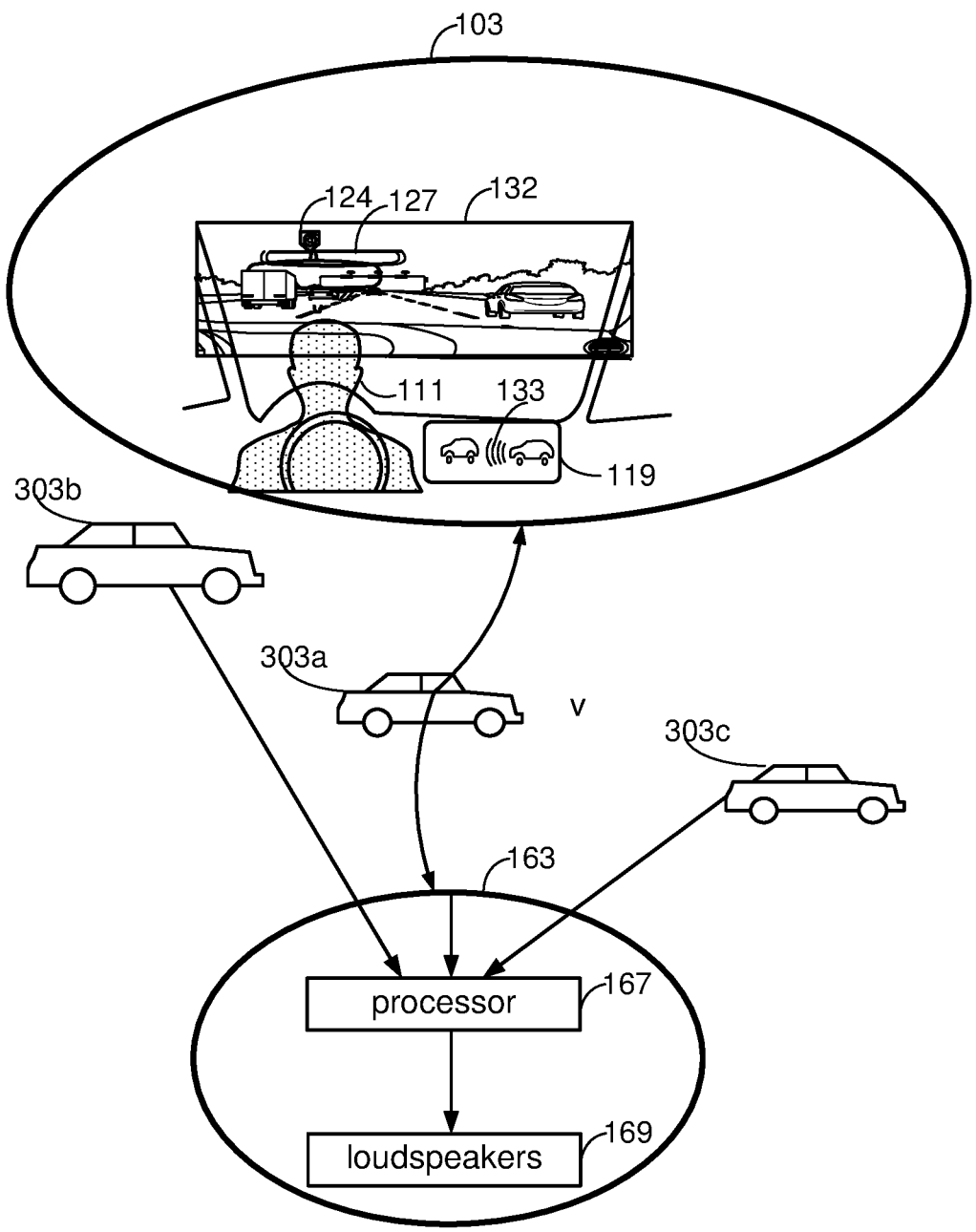
FIG. 1a illustrates a conceptual diagram of a first device in communication with another device (e.g., a second device) based on detection of a selection of the other device.

Certain wireless communication systems may be used to communicate data that is associated with high reliability and low latency. One non-limiting example of such data includes C-V2X and V2X communications. For example, self-driving cars may rely on wireless communications. Self-driving cars may include some sensors, e.g., Light Detection and Ranging (LIDAR), RAdio Detection And Ranging (RADAR), cameras etc., that are line of sight sensors. C-V2X and V2X communication, however, may include line of sight and non-line of sight wireless communications. Currently C-V2X and V2X communications are examples of using of non-line of sight wireless communications for handling the communication between vehicles approaching a common intersection but not within sight of one another. C-V2X and V2X communication can be used to share sensor information between the vehicles. This and other communication scenarios raise certain considerations. For example, for a particular location or geographical area there may be several vehicles sensing the same information such as an obstacle or a pedestrian. This raises the question of which vehicle should broadcast such information (e.g., sensor data), how such information is shared (e.g., which channel configuration provides reduced latency and improved reliability), and the like.

A C-V2X communication system may have logical channels and transport channels. The logical channels and transport channels may be used as part of uplink and downlink data transfers between a first device (e.g., a headset or vehicle) and a base station or another intermedia node in the network. A person having ordinary skill in the art may recognize that the logical channels may include different types of control channels, e.g., xBCCH, xCCH, xDCCH. The xBCCH type channel may be used when the first device is downloading broadcast system control information from another entity (e.g., a server, or a base station). The xCCCH control channel may be used to transmit control information between the first device (e.g., a vehicle, mobile device, or headset) and the network (e.g., a node in the network base station). The xCCCH control channel may be used when the first device (e.g., a vehicle, mobile device, or headset) does not have a radio resource control connection with the network. The xDCCH control channel includes control information between the first device and a network. The XDCCH control channel is used by the first device having a radio resource control connection with the network. The xDCCH is also bi-directional, i.e., control information may be transmitted and received by the first device and the network.

Generally, some information bits conveyed in the different types of control channels mentioned above may provide an indication of the location of the data channels (or resources). Since data may span several sub-carriers (depending upon the amount of transmitted data) and the control channels are currently fixed in size, this may introduce transients or gaps in time/frequency between the control channel and the corresponding data channel. This results in unused frequency/time resources of the control channels. It may be possible to leverage the unused frequency/time resources for other purposes for communicating media between vehicles or between devices. It may also be possible to create new channels in a V2X or C-V2X system, specifically, for the exchange of media between vehicles or between devices, such as virtual teleportation of visual objects and audio objects Virtual teleportation is used to describe the real-time transfer received at a first device of a representation of a real-world object, e.g., a person, to another device. The representation may be a visual representation, such as a video images captured in real-time one or more cameras of the real-world object located in or near another device, or by avatar data resulting in the scanning of the real-world object by a three-dimensional scanner in or near another device. The representation may also be audio data. The audio data may be captured, also in real-time, by one or microphones in or near another device. The audio data may be processed and the location of the audio source, associated with the real-world object may be determined. The audio source may be a person's voice, in such case, the audio source is determined to be a single audio object. If there are multiple people, there may be multiple audio sources, and hence, multiple audio objects. In addition, the one or more microphones located in or near another device may capture other audio sources, such as music, road noise, a loud voice outside of a vehicle or fixed environment. In such cases, the audio data may include the location of multiple audio objects.

As noted above, vehicles are using many advancements from other fields to improve their safety, infotainment systems, and overall user experience.

For example, object detection algorithms that incorporate sensors such as RADAR, LIDAR, or computer vision may be used in a vehicle to perform object detection while driving. These objects may include lanes in the road, stop signs, other vehicles or pedestrians. Some of the V2X and C-V2X use cases envision cooperative V2X systems to alert the vehicle or driver of the vehicle when there may be a likely collision between the vehicle and another object (e.g., a car, bicycle or person). Because of the relatively nascent nature of the V2X and C-V2X systems, a number of refinements have yet to be envisioned.

One area for refinement is in communications between people while in different vehicles, or people that are in different fixed environments. For example, the cabin of a vehicle is a fixed environment, i.e., the structures such as the location of the seats, dashboards, are mostly static. Another example of a fixed environment is inside of a home, office or classroom, where there may be chairs, sofas, or other furniture. Though it is possible for someone in a fixed environment to communicate with another person in a different fixed environment, the communication is done by making a phone call. The initiator of the phone call knows what phone number to dial to communicate with the other person, then dials it.

This disclosure envisions refinements to the way that a device (e.g. a vehicle) allows for receiving a communication signal from a second device (e.g. another vehicle or headset device). The first device may include one or more processors configured to receive, in the communication signal, packets that represent a virtual image as part of a virtual teleportation of one or more visual objects embedded in the virtual image. The one or more processors may be configured to decode the packets that represent the virtual image. In addition, the one or more processors may be configured to output the virtual image at a physical location within the fixed environment.

The first device may include two or more loudspeakers configured to render a three-dimensional audio signal, wherein the three-dimensional audio signal includes one or more audio objects spatially located where the virtual image of the teleported object appears to physically be situated within the fixed environment. For example, the virtual image of the teleported object may appear projected at a physical location within the vehicle. Alternatively, the virtual image of the teleported object may appear to be on a retinal projector, or on a display surface of the vehicle (e.g., table, windshield, display device, mirror), or on a display surface of a headset (e.g., HMD, XR, AR, VR device)

In addition, the three-dimensional audio signal may be perceived as emanating from the direction from where the virtual image teleported from. Moreover, the audio signal may include a sound pattern during the teleportation of the virtual image, prior to the teleportation of the virtual image, or after the teleportation of the virtual image. The sound pattern may include tones or may be a pre-recorded sound. For example, today cell phones have ringtones associated with a contact. Though, a sound pattern may be a ringtone, or some other sound pattern, the ringtones do not occur during the teleportation of the virtual image, prior to the teleportation of the virtual image, or after the teleportation of the virtual image.

In addition, ringtones or other sound patterns currently do not emanate from the direction where the virtual image is teleported from. For example, prior to the teleportation of the virtual image, there may be a first sound pattern that may act as an identification that a teleportation is about to take place. The first sound pattern may be a ringtone or some other sound pattern; however, the first sound pattern may also sound may be perceived as emanating from the direction from where the virtual image is about to be teleported from. In another example, a sound pattern does not have to be three-dimensional, nor does it have to be perceived as if it is emanating from the direction from where the virtual image is about to be teleported from, is teleporting from, or just teleported from. The sound pattern may just indicate that there is a teleportation about to occur, is happening, or just happened.

As an example, consider that there is a virtual image that is teleported into the vehicle during teleportation, and the virtual image may visually appear to be "coming in" from the right. It may also be possible that a sound pattern may also emanate from the right.

In addition, there may be separate sound patterns that are different than the sound pattern heard prior to the teleportation of the virtual image. These separate sound patterns, for example, may include a second sound pattern that occurs while the teleportation of the virtual image is taking place. In addition, there may be a third sound pattern that occurs after the teleportation of the virtual image took place.

Additional techniques and context are described herein with reference to the figures.

FIG. 1a illustrates a conceptual diagram of a first device that can be communicated with another device (e.g., a second device). The conceptual diagram also includes detection of a selection, within the first device, of the other device. For example, the first device may be a first vehicle 303a which is capable of communicating with second device through a V2X or C-V2X communication system. The first vehicle 303a may include different components or a person 111 as shown in the circle 103 above. The person 111 may be driving, or the person 111 may not be driving if the first vehicle 303a is self-driving. The person 111 may see other vehicles driving on the road, through the mirror 127, or the window 132, of the first vehicle 303a and wish to hear the type of music that is playing on the radio within another vehicle. In some configurations of the first vehicle 303a, a camera 124 of the first vehicle 303a may aid the person 111 to see other vehicles that may be challenging to see through the mirror 127 or the window 132.

The person 111 may select at least one target object that's external to the vehicle, or if the person 111 is wearing a headset, the at least one target object is external to the headset. The target object may be a vehicle itself, i.e., the second vehicle may be the target object. Alternatively, the target object may be another person. The selection may be a result of an image detection algorithm that may be coded in instructions that are executed by a processor in the first vehicle. The image detection algorithm may be aided by external cameras mounted on the first vehicle. The image detection algorithm may detect different types of vehicles or may just detect faces.

In addition, or alternatively, the person 111 may utter a descriptor to identify the target vehicle. For example, if the second vehicle is a black Honda accord, the person may utter "the Honda accord," "the black Honda accord in front of me," "the accord to my left," etc., and a speech recognition algorithm that may be coded in instructions that are executed on a processor in the first vehicle to detect and/or recognize the phrase or keywords (e.g., the makes and models of cars). As such, the first device may include the selection of the at least one target object is based on detection of a command signal based on keyword detection.

The processor that executes the instructions for the image detection algorithm may not necessarily be the same processor that executes the instructions for the speech recognition algorithm. If the processors are not the same, the may work independently or work in a coordinated fashion, e.g., to aid the image or speech recognition of the other processor. One or more processors, which may include the same processor used in either the image detection or speech recognition, or a different processor may be configured to detect the selection of the at least on target object of the first device. That is to say, one or more processors may be used to detect which target object (e.g., face or another vehicle or headset) was selected. The selection may initiate a communication between the second device (the other vehicle or headset). In some instances, the channel of communication between the first device and second device may have already been established. In some instances, the image detection algorithm may also incorporate aspects of image recognition, e.g., detecting a vehicle vs. detecting a "Honda accord." For simplicity, in this disclosure, image detection algorithms may include image recognition aspects, unless expressly stated otherwise.

As mentioned above, when two people wish to communicate with each other and speak, one person calls the other person by dialing a phone number. Alternatively, two devices may be wirelessly connected to each other, and each device may register the Internet Protocol (IP) address of the other device if both devices are connected to a communication network. In FIG. 1a, the communication between the first device and second device, may also be established through each of the devices respective IP address in a V2X, C-V2X communication network, or network with capabilities of connecting two devices directly, e.g., without the use of a base station. However, unlike instant messaging, chatting, or emailing, the communication between the first device and the second device is initiated based on a selection of the target object associated with the second device or based on the selection of the second device itself directly.

For example, the person 111 in the vehicle 303a may see a second vehicle 303b, or a different second vehicle 303c, and may wish to initiate communication with the person in one of those vehicles based on image detection, image recognition, or speech recognition of the vehicle.

After selection of the target object, the one or more processors in the first device may be configured to initiate communication including based on an IP address. In the case where the person 111 is a driver of the first vehicle, it is unsafe to initiate messaging, email, or chatting through a dialogue window with the use of one's hands. However, audio user interfaces to speak without the use of hands are increasingly becoming more popular, and in the system illustrated in FIG. 1a it may be possible to initiate communication between two devices and speak to another person based on a V2X or C-V2X communication system. Vehicles may communicate using V2V communications or a sidelink channel using C-V2X. An advantage of C-V2X systems is that vehicles may send communication signals between vehicles independent of whether the vehicle is connected to a cellular network or not.

It may also be possible for vehicles to communicate using V2V or C-V2X communications or a sidelink channel when the vehicles are wirelessly connected to a cellular network.

It may possible to include other data in the sidelink channel. For example, audio packets that are being received as part of the virtual transportation may be received via the sidelink channel. In the case where the person 111 is not driving, either because the vehicle is driving itself, or because the person 111 is a passenger, it may be possible to also to send instant messages between devices in the sidelink channel. The instant messages may be part of a media exchange, which may include audio packets, between a first device and a second device.

Also illustrated in the top circle 103 is a display device 119. The display device 119 may represent images or icons of vehicles. When the communication is initiated or during the communication between the first vehicle 303a and a second vehicle, e.g. 303b or 303c, a pattern 133 may light up or may blink on and off.

Moreover, after selection of the target object, audio packets may be received from the second device as a result of the channel of communication between the at least one target object external to the first device and the second device. For example, the circle 163 below includes a processor 167 which may be configured to decode the audio packets, received from the second device, to generate an audio signal, and output the audio signal based on the selection of the at least one target object external to the first device. That is to say, one may be able to hear, through playback of the loudspeakers 169 what speech or music is playing in the second vehicle (or headset device).

As explained later in this disclosure, other modes of selection may be possible, including gesture detection of person 111, and eye gaze detection of person 111.

Figure 1B:
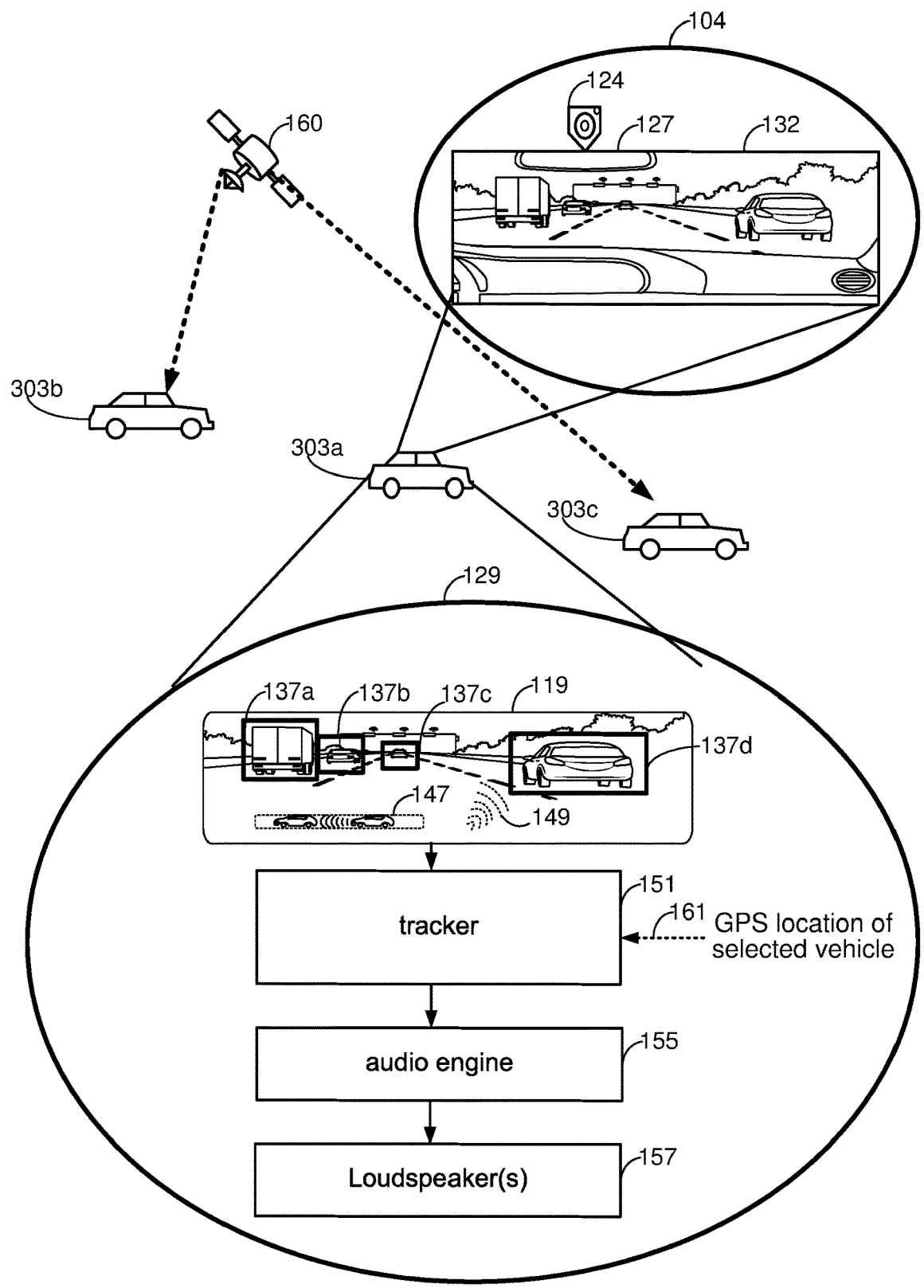
FIG. 1b illustrates a conceptual diagram of a first device that can be communicated with another device (e.g., a second device) based on detection of a selection of the other device and aided by a tracker.

FIG. 1b illustrates a conceptual diagram of a first device that can be communicated with another device (e.g., a second device). The conceptual diagram also includes detection of a selection, within the first device, of the other device, aided by a tracker.

FIG. 1b has a similar to the description associated with FIG. 1a, with the addition of other elements. For example, the top circle 104 does not illustrate the device 119 as it is illustrated in the lower circle 129. The top circle 104 illustrates vehicles outside of a window 132, the mirror 127 and the internal camera 124 which function as described with respect to FIG. 1a.

The lower circle 129 illustrates the display device 119. In addition to just representing icons, or images of a vehicle 133, the display device may represent images of the actual vehicles that may be potential selections by a person 111 in the first vehicle 303a. For example, images of vehicles captured by one or more external cameras (e.g. 310b in FIG. 3, 402 in FIG. 4) are represented on display device 119. The images of the vehicles may have bounding boxes 137a-137d encapsulating each of the images of the vehicles. The bounding boxes may help in the selection of the target object, e.g., one of the vehicles represented on the display device. In addition, instead of the pattern 133 between the icons and images of a vehicle, there may be a separate pattern 149 from the perspective of the person 111 who selected the second vehicle. Thus, bounding box 137d may illustrate a second vehicle 303b selected, and the direction of the separate pattern 149 may be lit or may also blink on and off to denote that communication has been initiated or is taking place with the second vehicle 303b.

In addition, a processor may include a tracker 151, and a feature extractor (not shown) that may perform feature extraction on images on the display device 119. The extracted features alone, or in some configurations in conjunction with the RADAR/LIDAR sensor(s), may aid in the estimate of the relative position of the vehicle selected, e.g. 303b. In other configurations, the tracker 151 may be aided or operate solely on the input from GPS location of the selected vehicle that may also be transmitted to the first vehicle 303a through a channel of communication in a V2X or C-V2X system.

For example, a second vehicle 303b, or another second vehicle 303c may not be visible with a camera. In such a scenario, the vehicles, vehicle 303b and 303c, may each have a GPS receiver that detects the location of each vehicle. The location of each vehicle may be received by the first device, e.g., vehicle 303a, via assisted GPS or if the V2X or C-V2X system allows it, directly through the V2X or C-V2X system. The reception of the location of the vehicle may be represented by GPS coordinates, as determined by one or more GPS satellites 160 alone, or in conjunction with a base station (as used in assisted GPS for example). The first device may calculate its own position relative to the other vehicles, vehicle 303b and 303c, based on knowing the first device (its own) GPS coordinates via its own GPS receiver. In addition to, or alternatively, the first device may calculate its own position based on the user of RADAR sensors, LIDAR sensors, or cameras coupled to the first device. It is understood that a calculation may also be referred to as an estimation. Thus, the first device may estimate its own position based on RADAR sensors, LIDAR sensors, cameras coupled to the first device, or receiving GPS coordinates. In addition, each vehicle or device may know its own position by using assisted GPS, i.e., having a base station or other intermediary structure receive GPS coordinates and relay them to each vehicle or device.

Moreover, the display device 119 may represent an image of the second device in a relative position of the first device. That is to say, the external facing camera(s) 310b, or 402 in coordination with the display device 119 may represent the second device in a relative position of the first device. Thus, the display device 119 may be configured to represent the relative position of the second device. In addition, the relative position of the second device may represented as an image of the second device on the display device 119.

In addition, the audio engine 155 which may be integrated to the one or more processors may process the decoded audio packets based on the relative position of the device. The audio engine 155 may be part of an audio spatializer which may be integrated as part of the processor, may output the audio signal as a three-dimensional spatialized audio signal based on a relative position of the second device as represented on the display device 119.

As discussed above, the relative position may also be based on a GPS receiver, which may be coupled to the tracker 151 and may be integrated with the one or more processors, and the first device may perform assisted GPS to determine the relative position of the second device. The audio engine 155 which may be part of an audio spatializer which may be integrated as part of the processor, may output the audio signal as a three-dimensional spatialized audio signal based on a relative position determined by assisted GPS of the second device 161.

Moreover, in some configurations, the external facing cameras 310b and 402 may capture devices or vehicles that are in front or behind the first vehicle 303a. In such scenarios, it may be desirable to hear the sounds emanating from the vehicles or devices that are behind the first vehicle 303a (or if a headset, behind the person wearing a headset) with a different spatial resolution than those that are in front of the first vehicle 303a. Hence, the output of the three-dimensional spatialized audio signal at a different spatial resolution when the second device is at a first location (e.g., in front of the first device) relative to the first device, as compared to a second location (e.g., behind the first device) relative to the second device.

In addition, as the relative position of the at least one target object (e.g., a second device or second vehicle) external to the first device, is being tracked, the one or more processors may be configured to receive an updated estimate of the relative position of the at least one target object that is external to the first device. Based on the updated estimate, the three-dimensional spatialized audio signal may be output. Thus, the first device may render the three-dimensional spatialized audio signal through the loudspeakers 157. A person in the first vehicle 303a or wearing a headset may hear sounds received by a second device, for example, the vehicle 303c that is in the front right of the first device, as if the audio is coming from the front-right. If the first device is a vehicle 303a, the front right is with respect a potential driver of the vehicle 303a looking outwards out of the window 132 as if he or she were driving the vehicle 303a. If the first device is a headset, the front right is with respect to a person wearing a headset looking straight ahead.

In some scenarios, it may be possible for the audio engine 155 to receive multiple audio streams, i.e., audio/speech packets from multiple devices or vehicles. That is to say, that there may be multiple target objects that are selected. The multiple target objects external to the first device may be vehicles, headsets, or a combination of headsets and vehicles. In such scenarios where there are multiple target objects, the loudspeakers 157 may be configured to render the three-dimensional spatialized audio signal based on the relative position of each of the multiple vehicles (e.g., 303b and 303c) or devices (e.g. headsets). It is also possible that the audio streams may be mixed into one auditory channel and be heard together, as if there is a multi-party conversation between at least one person in the secondary vehicles (e.g., 303b and 303c).

In some configurations, the audio/speech packets may be received in a separate communication channel from each of the multiple vehicles. That is to say, the first vehicle 303a may receive audio/speech packets from a secondary vehicle 303b in one communication channel, and also receive audio/speech packets from a different secondary vehicle 303c in a different communication channel 303c. The audio packets (for simplicity) may represent speech spoken by at least one person in each vehicle of the secondary vehicles.

In such scenarios, the passenger in the first vehicle 303a or headset, may select two target objects by the techniques addressed throughout other parts of this disclosure. For example, the person 111 in the first vehicle 303a may tap in the area on a display device 119 encapsulated by the bounding boxes 137a-137d, to select at least two vehicles (e.g., 303b and 303c) by which to have a multi-party communication with. Alternatively, the person 111 may use speech recognition to select at least two vehicles (e.g., 303b and 303c) by which to have a multi-party communication with.

In some configurations, the one or more processors may be configured to authenticate each of the person or vehicles of the secondary vehicles, to facilitate a trusted multi-party conversation between at least one person in a secondary vehicle (e.g., 303b and 303c) and a person 111 in the first vehicle 303a. Authentication may be based on speech recognition, if the people are comfortable storing samples of each other's voice in their vehicles. Other authentication methods may be possible involving face or image recognition of the persons or vehicles in the multi-party conversation.

Figure 1C:
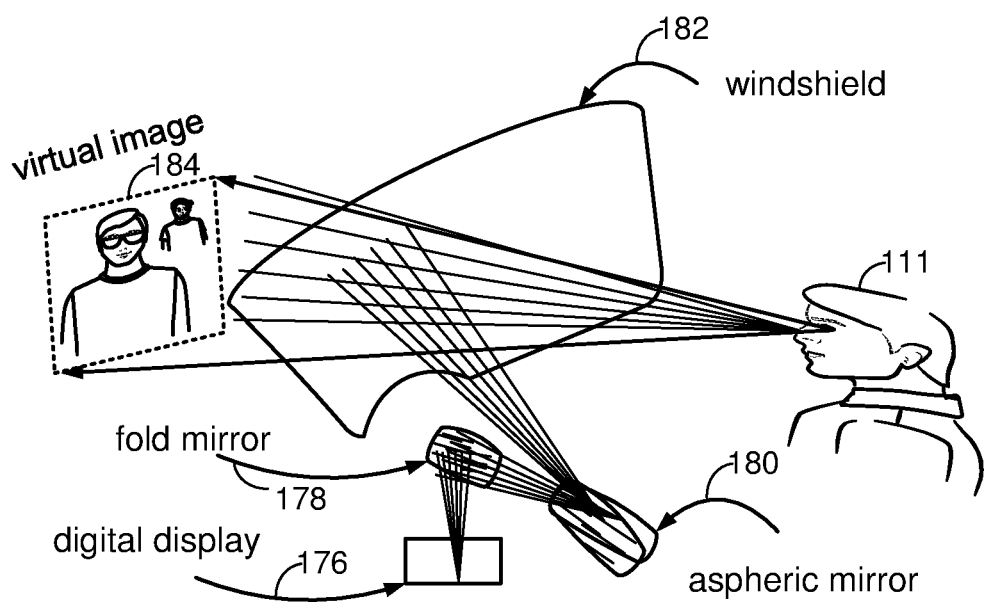
FIG. 1c illustrates a conceptual diagram of a Heads-Up Display (HUD) architecture.

FIG. 1c illustrates a conceptual diagram of a Heads-Up Display (HUD) architecture in a vehicle. The vehicle, which is an example of a first device, may include a display device (e.g., a digital display 176) for a person 111 in the vehicle to view the teleported object into the fixed environment. The display device (e.g., a digital display 176) may be a Heads Up Display as illustrated in FIG. 1c. The display device may be within variable distance of centimeters of the physical location of where the virtual image appears to be teleported to, within the fixed environment. For example, if the virtual image of the teleported object appears to be teleported to be in the passenger seat of a vehicle, and there is a projector located near the passenger seat, the variable distance between where the projection of the virtual image and the projector may be within 60 centimeters. For example, the projector may be located on the ceiling of the vehicle and the projection may be on near the passenger seat, or the back seat. The projection may also be on a windshield 182 of the vehicle. The projection surfaces may be within 60 centimeters of the projector and the projection of the virtual image 184. For example, a vehicle may have windshields 182 at different distances between each windshield and a projector. Thus, for a windshield 182 that's in front of a driver the distance may be within 60 centimeters. However, if there is a windshield closer to the back seat, e.g., the rear windshield (not drawn) or rear side windshield, the distance between the projector and the windshield may be a greater distance, e.g., within 90 centimeters. In such cases, where the in-cabin of the vehicle is larger than a car, e.g., a mini-van, or bus, the projected image may be within 120 cm of a projector. In this example, the HUD is in the physical location of the in-cabin of the fixed environment, i.e., the vehicle. However, the virtual image 184 may be projected outside of cabin of the vehicle. Though, the projection may be technically be outside of the cabin of the vehicle, the projection of the virtual image 184 is still part of the fixed environment, as the HUD, mirrors, and windshield 182 are all part of the fixed environment. The virtual image 184 may move with the vehicle. The HUD may include an optical combiner and different optical components configured to display the virtual image. In addition, the HUD may be integrated into a windshield 182 of a vehicle and the virtual image 184 may be displayed on the windshield (in an alternate configuration). In an example, the HUD may be physically separated from a windshield 182, and the virtual image 184 is displayed in free space in a plane that is behind the windshield 182 of the vehicle as mentioned above. The virtual image 184 may be a two-dimensional avatar data or three-dimensional avatar data. Moreover, the vehicle may include two or more loudspeakers, configured to render an audio signal that is associated with the virtual image.

A HUD may include an optical combiner a display system with different optical components such as a fold mirror 178 and aspheric mirror 180 as shown in FIG. 1c. In addition, the windshield 182 may be a combiner.

The virtual image, as described previously, may be coupled to a two-dimensional audio signal or three-dimensional audio signal. The two-dimensional audio signal or three-dimensional audio signal may include one or more audio objects that appear to be spatially located where the virtual image appears to physically be situated within the fixed environment.

In addition, the three-dimensional audio signal may be perceived as emanating from the direction from where the virtual image teleported from. For example, as explained further in FIG. 4a, a driver of the first vehicle or first device may select a target object, i.e., real world object that is located at a distance and angle away from the first vehicle or first device. As the virtual teleportation is about to take place, an audio signal may include a sound pattern during the teleportation of the virtual image, that is prior to the teleportation of the virtual image that appears to be coming from the distance and angle selected of the target object. The sound pattern, prior to teleportation of the teleported object, may include tones or may be a pre-recorded sound.

Figure 1D:
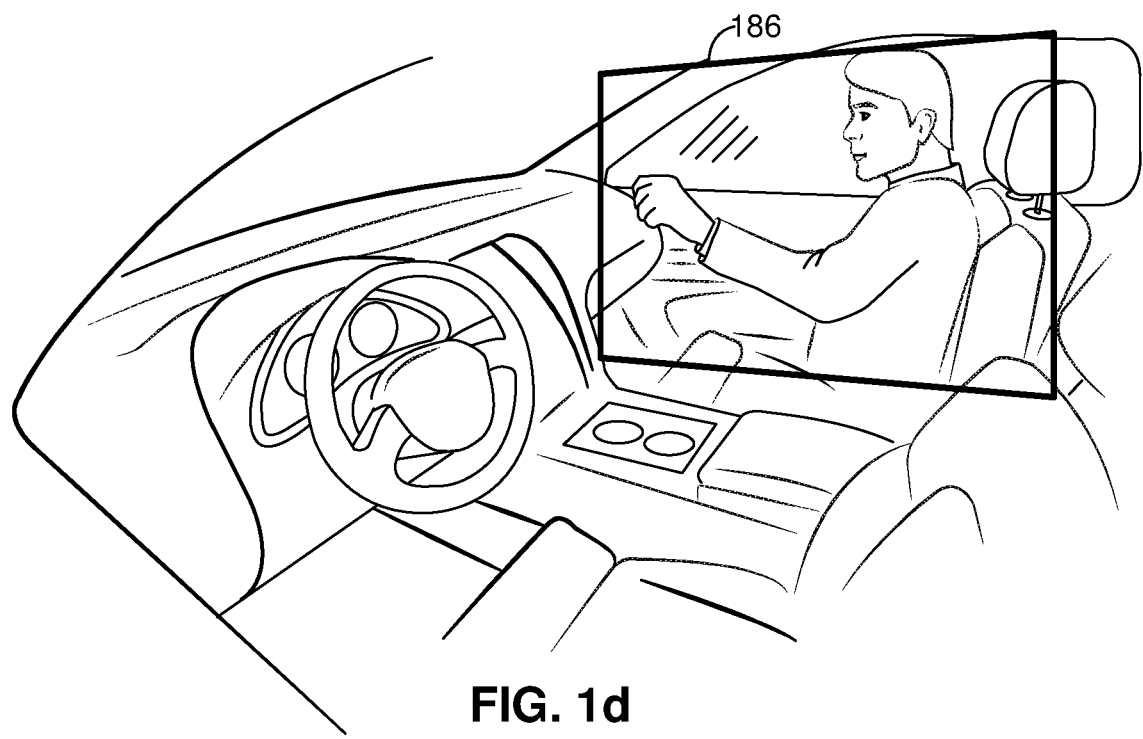
FIG. 1d illustrates a conceptual diagram of a person projected into a passenger seat in a vehicle via wireless connections according to the techniques described in this disclosure.

FIG. 1d illustrates a conceptual diagram of a person projected into a passenger seat in a vehicle via wireless connections according to the techniques described in this disclosure. In a different embodiment, the vehicle may include a projector. As illustrated in FIG. 1d, the projector may be configured to project the virtual image. The projected virtual image may be projected onto a semi-transparent projection screen or display 186. In another embodiment, projector lighting may be utilized. In FIG. 1d, the virtual image is that of a person, that appears to be a passenger. The virtual passenger may be a different passenger or driver in another vehicle or other fixed environment (e.g., a school, office, or a home). The projection screen or display 186 may be raised or lowered from within the cabin of the vehicle. The virtual image, i.e., virtual passenger may include either two-dimensional avatar data or three-dimensional avatar data. When the virtual passenger speaks, it sounds as if the passenger is in the passenger seat where the virtual image is. That is, the virtual passenger may be coupled to a two-dimensional audio signal or three-dimensional audio signal. The two-dimensional audio signal or three-dimensional audio signal may include one or more audio objects (e.g., the person's voice) spatially located where the virtual image appears to physically be situated within the fixed environment. In some systems the projector or projector screen or display 186 may block sound waves or for some other technical limitation, it may not be possible to have the sound emanating from where the virtual image appears to be physically situated within the fix environment. Thus, to overcome the technical limitations, in a different embodiment, the one or more audio objects may be spatially located at a different location of where the virtual image appears to be physically situated within the fixed environment.

Figure 1E:
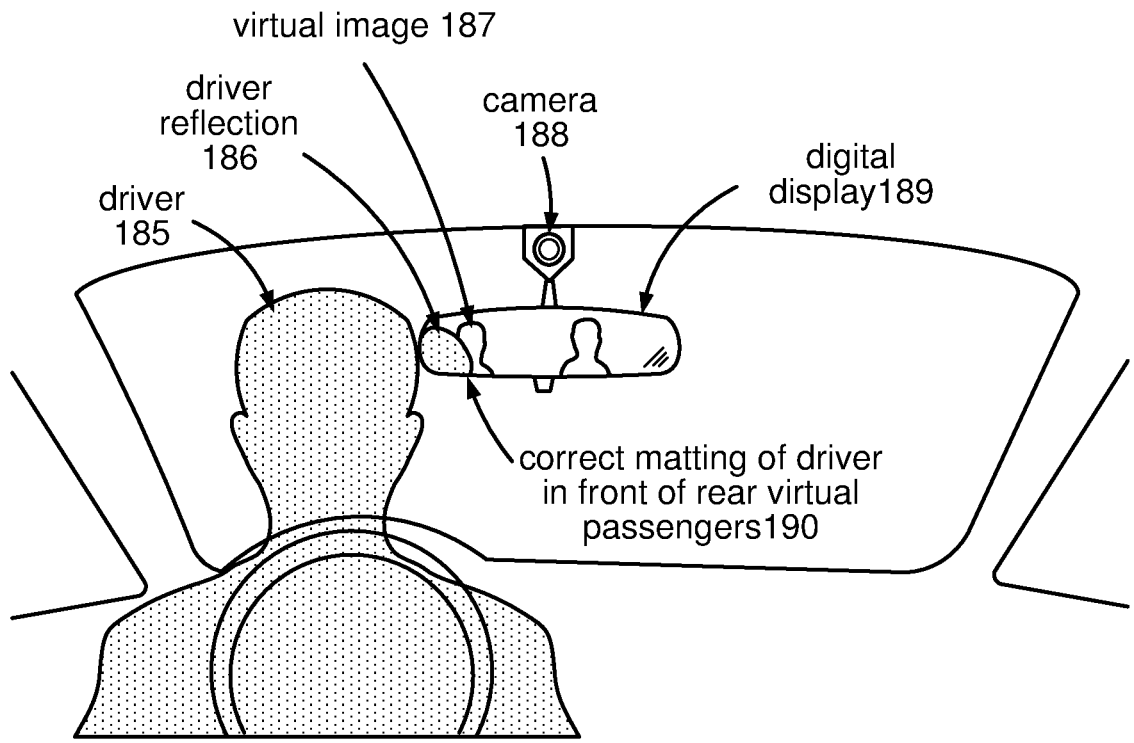
FIG. 1e illustrates a conceptual diagram of a digital display projecting virtual back seat passengers in a vehicle via wireless connections according to the techniques described in this disclosure.

In addition, the three-dimensional audio signal may be perceived as emanating from the direction from where the virtual image teleported from. Moreover, the audio signal may include a sound pattern during the teleportation of the virtual image, prior to the teleportation of the virtual image, or after the teleportation of the virtual image. The sound pattern, prior to the teleportation of the teleported object, may include tones or may be a pre-recorded sound. FIG. 1e illustrates a conceptual diagram of a digital display projecting virtual back seat passengers in a vehicle via wireless connections according to the techniques described in this disclosure. In a vehicle, there may be a digital rear-view mirror (e.g., a digital display 189 that acts as a mirror). The rear-view mirror may be configured to display the virtual image 187 (e.g., of the virtual back seat passengers). In addition, the vehicle may include two or more loudspeakers configured to render a three-dimensional audio signal that are spatially located at an image plane of the digital display 189 (e.g., rear view mirror 189). The image plane of the digital rear-view mirror may include a reflection of the virtual image 187.

As the virtual teleportation is about to take place, an audio signal may include a sound pattern during the teleportation of the virtual image, that is prior to the teleportation of the virtual image that appears to be coming from the distance and angle selected of the target object. The sound pattern, prior to teleportation of the teleported object, may include tones or may be a pre-recorded sound.

In addition, after the virtual teleportation of the virtual image, i.e., once the virtual image of the passengers, for example, are located in the fixed environment, e.g., a backseat of the vehicle, the voice of the virtual passengers may appear to emanate from the backseat The virtual backseat passengers may be perceived to sound as if they are in the backseat of the vehicle, even though the real-world target object is in another location and prior to the virtual teleportation a sound pattern appeared from that direction. In addition, in a different embodiment, even though the virtual backseat passengers appear visually in the backseat through the digital display 189, their voices may appear to sound as if they are emanating from the location of where the digital display 189 is located.

The virtual image may be a different passenger or driver in another vehicle or other fixed environment (e.g., a school, office, or a home). The virtual image, i.e., virtual passenger may include either two-dimensional avatar data or three-dimensional avatar data. When the virtual passenger speaks, it sounds as if the passenger is in the passenger seat where the virtual image is. That is, the virtual passenger may be coupled to a two-dimensional audio signal or three-dimensional audio signal. The two-dimensional audio signal or three-dimensional audio signal may include one or more audio objects (e.g., the person's voice) spatially located where the virtual image is perceived to physically be situated within the fixed environment.

The different passenger or driver in another vehicle or fixed environment may have a camera 188, for example, like the one shown in FIG. 1e, but in another vehicle, not the camera 188 shown in the first vehicle, to capture video images in real-time. Similarly, another vehicle or other fixed environment may have a three-dimensional scanner (not shown) in or near another device to capture, in real-time, avatar data that may be received by the first device. Reception of the real-time avatar data or video images is discussed further in relation to FIGS. 4b and 4c. In addition, in or near another device there may be one or microphones that capture real-time audio of the virtual passenger. Reception of the real-time audio is discussed further in relation to other figures, including at least FIGS. 4a, 4b, and 4c.

Figure 1F:
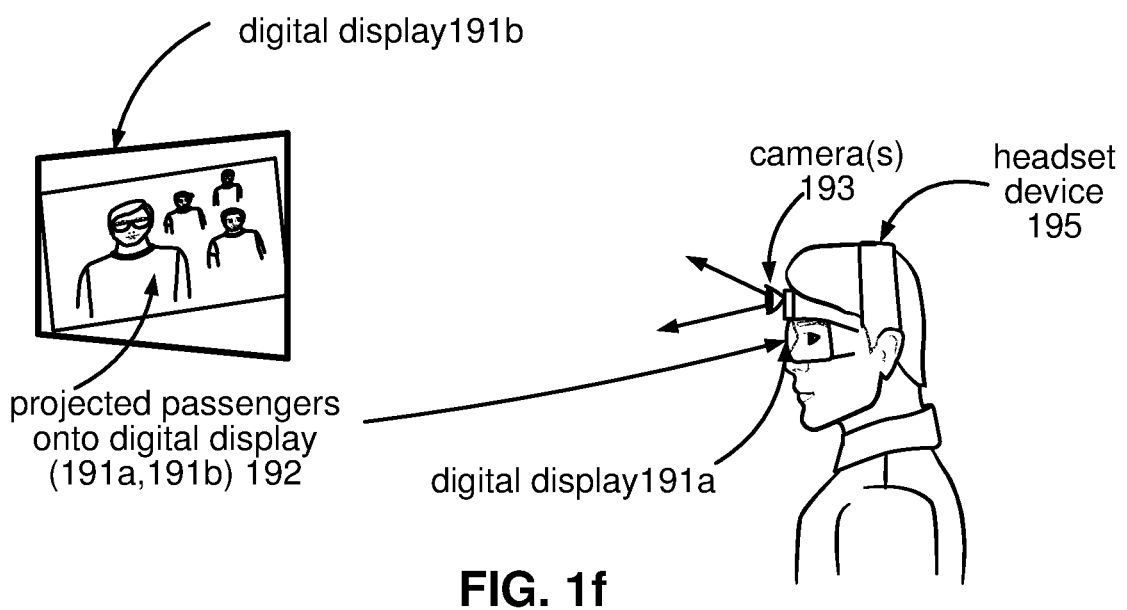
FIG. 1f illustrates a conceptual diagram of a display overlaying passengers in the background of the display that operate according to the techniques described in this disclosure.

FIG. 1f illustrates a conceptual diagram of a display overlaying passengers 192 in the background of the display that operate according to the techniques described in this disclosure. It may also be possible that the projection of the virtual image on the digital display 191a, 191b seen while the driver or another passenger is wearing a headset device 195. For example, the headset device 195 may be a head mounted display (HMD), augmented reality (AR), mixed reality (XR), virtual reality (VR) glasses. The projected passengers 192 may be projected onto the digital display 191a that is integrated into the headset device 195. In an alternative embodiment, a digital display 191b may be part of a surface within the vehicle (e.g., a table, a window) or may be part of another mobile device (e.g., a tablet, smartphone, or standalone display device). Projected passengers on the display 192 may be projected onto the digital display 191b. For example, using augmented reality techniques the projection of the passenger(s) 192 on the display 191b may be aided by one or more camera(s) 193 coupled to the headset device 195. The virtual image of the teleported object may appear to physically be situated within the fixed environment. For example, the virtual image of the teleported object may appear projected at a physical location within the vehicle such as a table or other surface in the vehicle, such as the display 191a. Alternatively, the virtual image of the teleported object may appear to be on a display surface of a headset device 195 (e.g., HMD, XR, AR, VR device). In such cases, where the display surface is on a headset device 195, the virtual image of the teleported object may be within less than 2 centimeters of where the projection device is.

The virtual image may be a different passenger or driver in another vehicle or other fixed environment (e.g., a school, office, or a home). The virtual image, i.e., virtual passenger may include either two-dimensional avatar data or three-dimensional avatar data. When the virtual passenger speaks, it sounds as if the virtual passenger(s) 192 is in the location (i.e., orientation on the screen) projected on the digital display 191a of the headset device 195, or digital display 191b viewed by the camera(s) 193 that are coupled to the headset device 195. That is, the virtual passenger(s) 192 may be coupled to a two-dimensional audio signal or three-dimensional audio signal. The two-dimensional audio signal or three-dimensional audio signal may include one or more audio objects (e.g., the person's voice) spatially located where the virtual image appears to be oriented relative to the position of the screen of the digital display 191a on the headset device 195, or the digital display 191b coupled to the headset device 195. The loudspeakers that generate the two-dimensional or three-dimensional audio signal may be mounted and integrated into the headset device 195.

In addition, the three-dimensional audio signal may be perceived as emanating from the direction from where the virtual image teleported from. Moreover, the audio signal may include a sound pattern during the teleportation of the virtual image, prior to the teleportation of the virtual image, or after the teleportation of the virtual image.

For example, as the virtual teleportation is about to take place, an audio signal may include a sound pattern during the teleportation of the virtual image, that is prior to the teleportation of the virtual image that appears to be coming from the distance and angle selected of the target object. The sound pattern, prior to teleportation of the teleported object, may include tones or may be a pre-recorded sound.

Figure 1G:
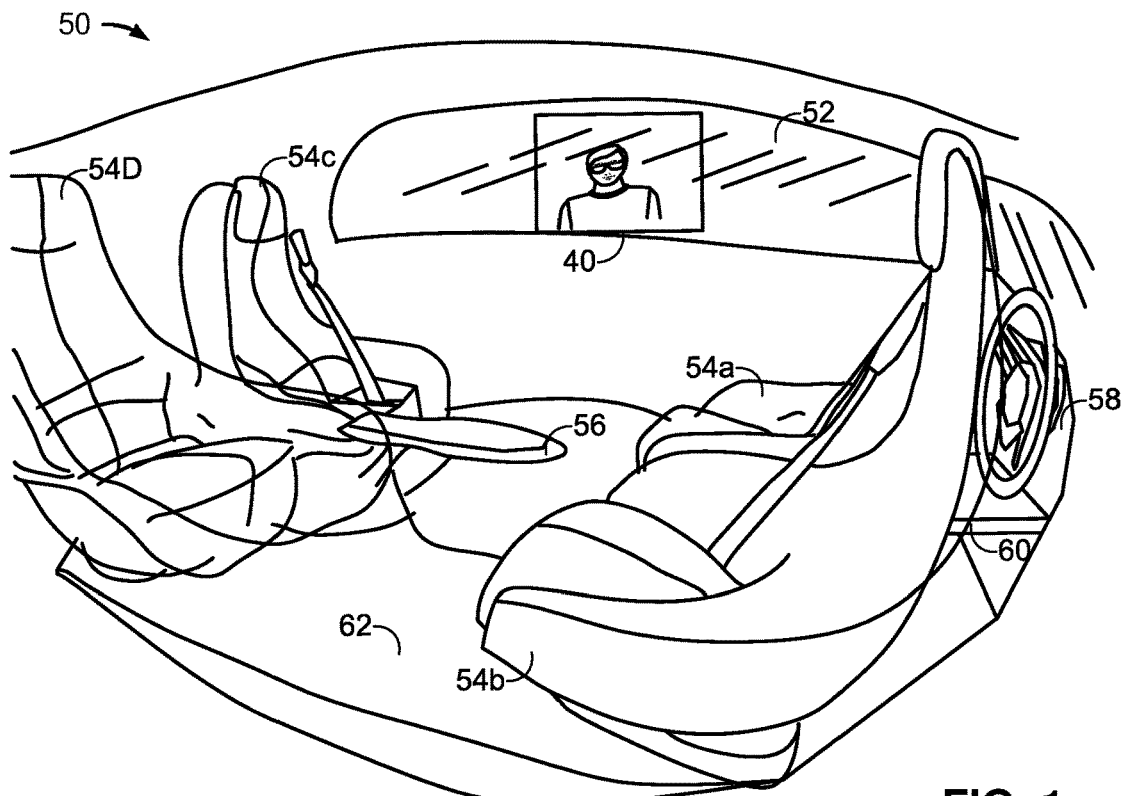
FIG. 1g illustrates a conceptual diagram of a display system in an autonomous vehicle that operates according to the techniques described in this disclosure.

FIG. 1g illustrates a conceptual diagram of a display system in an autonomous vehicle that operates according to the techniques described in this disclosure.

The cabin of an autonomous vehicle 50 may include a display device and a user interface unit 56. The display device may represent any type of passive reflective screen on which images can be projected, or an active reflective, emissive, or transmissive display capable of projecting images (such as a light emitting diode (LED) display, an organic LED (OLED) display, liquid crystal display (LCD), or any other type of active display).

As illustrated a display device may be integrated into the window 52 of the vehicle. Although shown as including a single display device (e.g., a single window), an autonomous vehicle may include a plurality of displays that may be positioned throughout the cabin of autonomous vehicle 50.

In some examples, passive versions of a display device or certain types of active versions of the display device (e.g., OLED displays) may be integrated into seats, tables, roof liners, flooring, windows (or in vehicles with no windows or few windows, walls) or other aspects of the cabin of autonomous vehicles.

To determine where within the cabin of an autonomous vehicle 50 to project the virtual passenger 40, there may be a pre-configured cabin context that defines the geometry of the cabin of an autonomous vehicle 50 along with specifying the location of the display device of where to project. For example, as illustrated the display device may be integrated into the window 52. However, the display device may be integrated into the seats 54A-54D, user interface unit 56, dashboard 58, console 60, cabin floor 62, or as part of an overhead projector 64. There may be cameras 66 coupled to the overhead projector 64 which may aid in identifying the location of people in the cabin of the autonomous vehicle, to aid in which display surface, or display surfaces(s) may include the one 40 or more virtual passengers to project onto.

Inside the cabin of the vehicle, may be located loudspeakers that are configured to render a three-dimensional audio signal such that an occupant in the cabin of the autonomous vehicle 50 may perceive sound as if emanating where the virtual visual objects appear to physically be situated, e.g., projected on the display device. For example, the loudspeakers may be configured to render the three-dimensional audio signal to include one or more audio objects that are spatially located where the virtual image (i.e., the virtual person) is perceived to physically be situated within the fixed environment. In this embodiment, the fixed environment is the cabin of the autonomous vehicle 50. The virtual person may be represented as either two-dimensional avatar data or three-dimensional avatar data.

Moreover, the audio signal may include a sound pattern during the teleportation of the virtual image, prior to the teleportation of the virtual image, or after the teleportation of the virtual image.

For example, as the virtual teleportation is about to take place, an audio signal may include a sound pattern during the teleportation of the virtual image, that is prior to the teleportation of the virtual image that appears to be coming from the distance and angle selected of the target object. The sound pattern, prior to teleportation of the teleported object, may include tones or may be a pre-recorded sound.

Figure 1H:
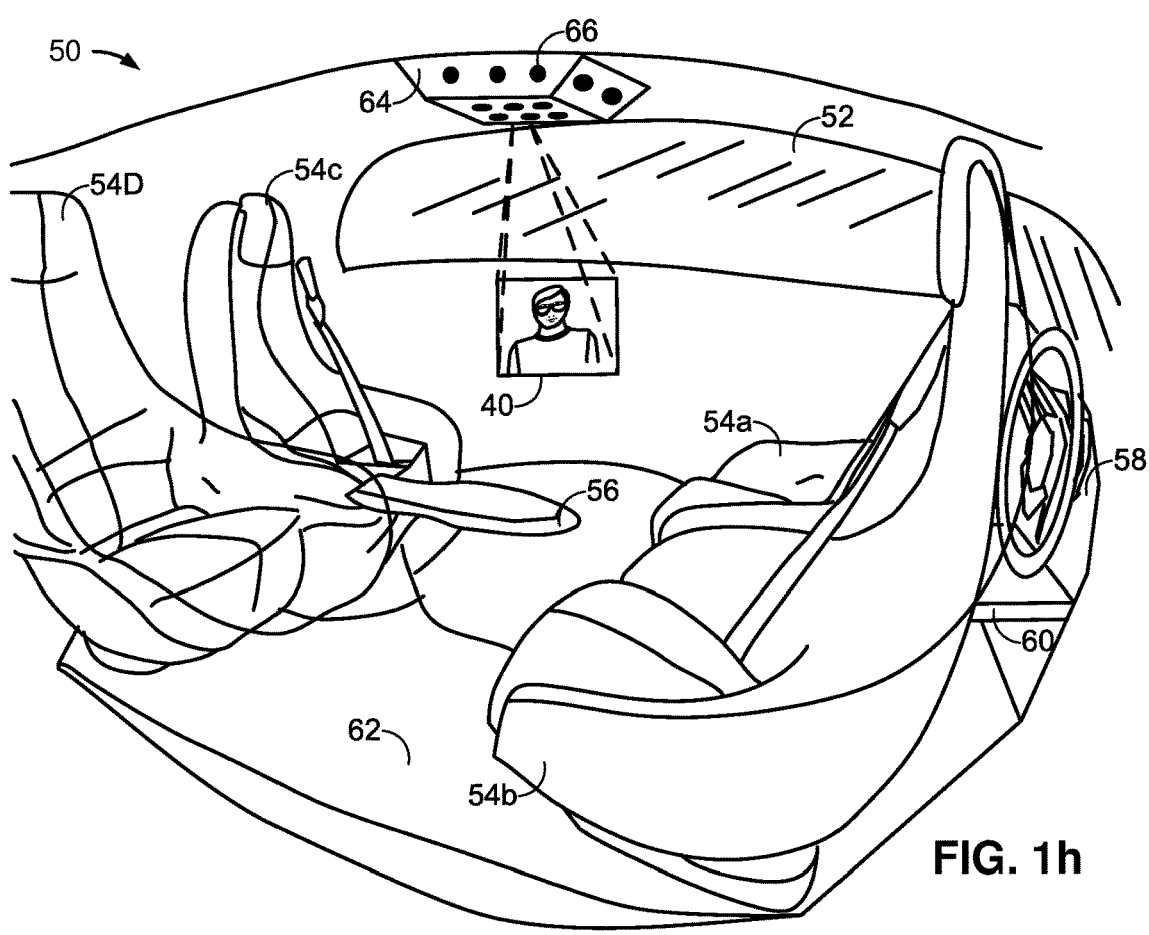
FIG. 1h illustrates a conceptual diagram of a display system in an autonomous vehicle that operates according to the techniques described in this disclosure.

FIG. 1h illustrates a conceptual diagram of a display system in an autonomous vehicle that operates according to the techniques described in this disclosure.

The display device may also include a projector 64 or other image projection device capable of projecting or otherwise recreating an image 40 on a passive display. In some embodiments, the projector 64 may create a 3D hologram or other 3D view inside the cabin of the autonomous vehicle 50. In addition, though not expressly shown in FIG. 1h, the display device may also represent displays in wired or wireless communication with one or more processors in the cabin of the autonomous vehicle 50. For example, there may be a mobile device or other device within the autonomous vehicle. The mobile device or other devices' display may, for example, represent a computing device, such as a laptop computer, a heads-up display, a head-mounted display, an augmented reality computing device or display (such as "smart glasses"), a virtual reality computing device or display, a mobile phone (including a so-called "smart phone"), a tablet computer, a gaming system, or another type of computing device capable of acting as an extension of, or in place of, a display integrated into autonomous vehicle.

A user interface unit 56 may represent any type of physical or virtual interface with which a user may interface to control various functionalities of autonomous vehicle. The user interface unit 56 may include physical buttons, knobs, sliders or other physical control implements. The user interface unit 56 may also include a virtual interface whereby an occupant of autonomous vehicle interacts with virtual buttons, knobs, sliders or other virtual interface elements via, as one example, a touch-sensitive screen, or via a touchless interface. The occupant may interface with the user interface unit 56 to control one or more of a climate functions within the cabin of the autonomous vehicle 50, audio playback by loudspeakers within the cabin of the autonomous vehicle 50, video playback on the display device within the cabin of the autonomous vehicle 50, transmissions (such as cellphone calls, video conferencing calls, and/or web conferencing calls) through the user interface unit 56 in the cabin of the autonomous vehicle 50, or in some embodiments any other operation capable of being performed by the autonomous vehicle.

Inside the cabin of the vehicle, may be located loudspeakers that are configured to render a three-dimensional audio signal such that an occupant in the cabin of the autonomous vehicle 50 may perceive sound as if emanating where the virtual visual objects are physically located, i.e., projected on the display device. For example, the loudspeakers may be configured to render the three-dimensional audio signal to include one or more audio objects that are spatially located where the virtual image (i.e., the virtual person) is perceived to physically be situated within the fixed environment. In this embodiment, the fixed environment is the cabin of the autonomous vehicle 50. The virtual person may be represented as either two-dimensional avatar data or three-dimensional avatar data.

Moreover, the audio signal may include a sound pattern during the teleportation of the virtual image, prior to the teleportation of the virtual image, or after the teleportation of the virtual image.

For example, as the virtual teleportation is about to take place, an audio signal may include a sound pattern during the teleportation of the virtual image, that is prior to the teleportation of the virtual image that appears to be coming from the distance and angle selected of the target object. The sound pattern, prior to teleportation of the teleported object, may include tones or may be a pre-recorded sound.

A persona having ordinary skill in the art would recognize from various examples discussed above, the virtual image that was teleported to the first device may be rendered on a surface of a display screen of a display device. In addition, a person having ordinary skill in the art would recognize from the various examples discussed above, that the display device may be integrated into a headset device (e.g., HMD, XR, VR, AR, etc.). In addition, the display device may be integrated into the windshield or window in the first device. Moreover, the display device may be integrated into a table, a tablet in the first device, or, another mobile device in the first device. As also discussed, the display device may be integrated into the rear-view mirror in the first device. The headset devices (HMD, XR, VR, AR devices), or other devices (tablets, digital rear-view mirror) may render the virtual image that was teleported to the first device on the surface of a display screen of one of these display devices. In addition, the surfaces (windshield, window, table) may also have a projection or rendering of the virtual image that was teleported to the first device.

In addition, the first device may include two or more loudspeakers that are configured to render a three-dimensional audio signal that is spatially located at an image plane of the display device. For example, there may be a virtual image which appears to have sound emanating from the mouth of a person, and the virtual image is in the same plane as the sound. In a different embodiment, a headset device may render a virtual image on a display device that is integrated into the headset device. The virtual image has an image plane on the surface of the display device. However, the virtual image may appear as if it is at some distance away from the display device. In such case, the two or more loudspeakers may be configured to render a three-dimensional audio signal spatially located outside of an image plane of the display device, i.e., the sound appears to be some distance away, e.g., within 2 cm-120 cm (in accordance with the various examples of where the virtual image may appear to be located in the fixed environment).

FIG. 2 illustrates a flowchart of a process of a first device receiving packets that represent a virtual image as part of a virtual teleportation of one or more visual objects embedded in the virtual image communication based on the techniques described in this disclosure. A first device for receiving a communication signal from a second device, may include one or more processors configured to receive, in the communication signal, packets that represent a virtual image as part of a virtual teleportation of one or more visual objects embedded in the virtual image 210. Store the packets that represent the virtual image as part of the virtual teleportation of one or more visual objects embedded in the virtual image 215. The one or more processors may decode the packets that represent the virtual image 220, and, output the virtual image at a physical location within a fixed environment 230.

Figure 3A:
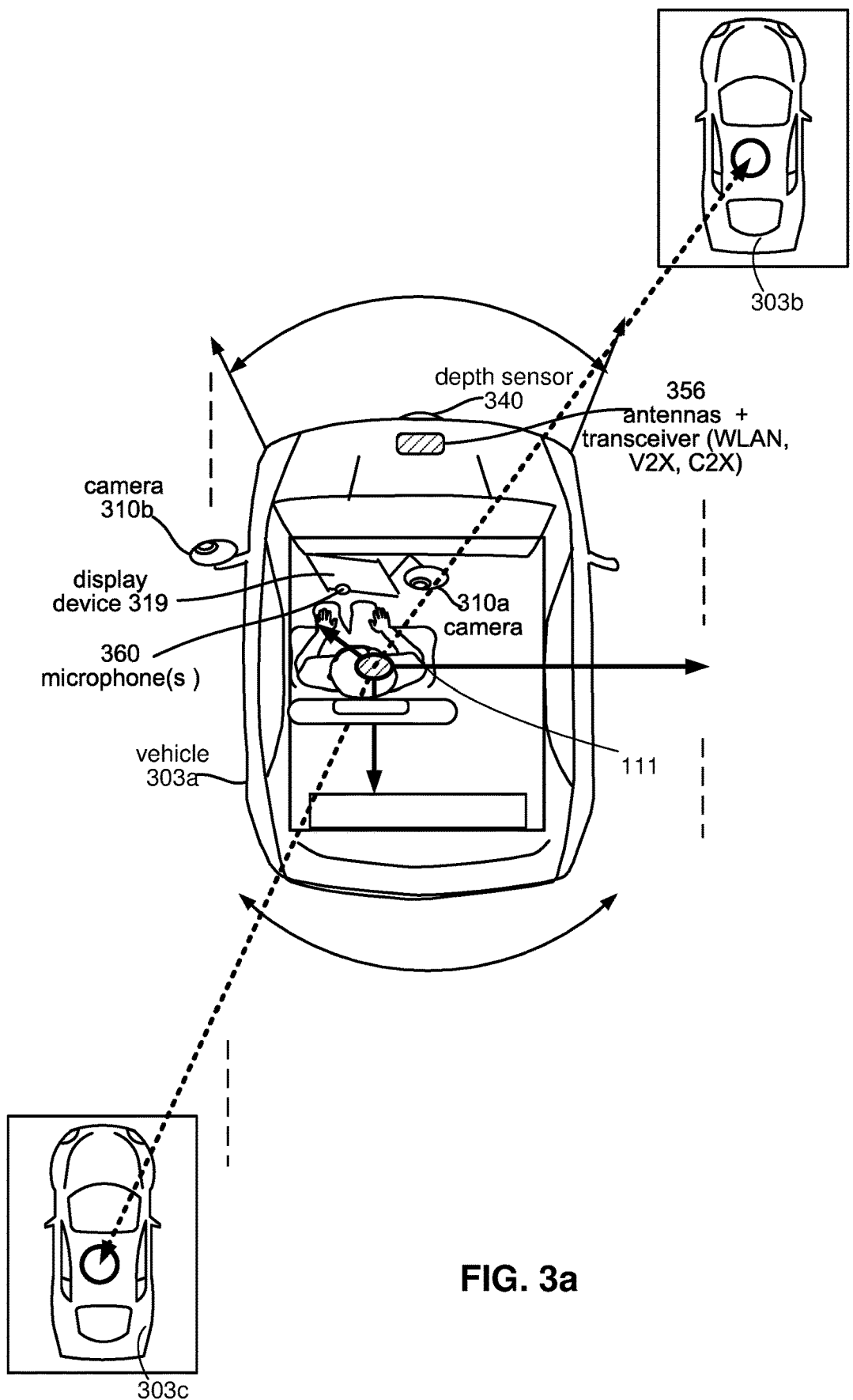
FIG. 3a illustrates a conceptual diagram of a first vehicle with different components on or in the first vehicle that operate according to the techniques described in this disclosure.

FIG. 3a illustrates a conceptual diagram of a first vehicle with different components on or in the first vehicle that operate according to the techniques described in this disclosure. As illustrated in FIG. 3a, a person 111 may be moving in a vehicle 303a. A selection of a target object external to the vehicle 303a may be within the view of the driver directly which may be captured by an eye gaze tracker (i.e., the person 111 is looking at the target object) or gesture detector (the person 111 makes a gesture, e.g., points to the target object) coupled to camera 310a within the vehicle 303a.

The first device may include the selection of the at least one target object that is based on detection of a command signal based on eye gaze detection. The at least one target object may include a real-world object, e.g., a passenger in a vehicle. In addition, the at least one target object may be a person wearing another headset device (e.g., a second headset device), or the at least one target object may be the second headset device. The person wearing the second headset device or in the selected vehicle may be virtually teleported to be seen in a first headset device or a first vehicle.

The camera 310b mounted on the vehicle 303a may also aid in the selection of the target object itself (e.g., the vehicle 303b) or another device associated with a target object, if the target object is a person external to the vehicle 303a, or there is some other recognizable image associated with the vehicle 303b.

Through either a wireless local area network (WLAN), which could be part of a cellular network such as C-V2X or the co-existence of a cellular network and a Wi-Fi network, or solely a Wi-Fi network, or a V2X network, the one or more antennas 356, optionally coupled with a depth sensor 340, may aid in the determination the relative location of where the target object is relative to the vehicle 303a.

It should be noted that through one or more antennas 356 the camera 310a mounted within the vehicle 303a, or the camera 310b mounted on the vehicle 303a, or both cameras 310a, 310b, depending on the bandwidth available, may form a personal area network (PAN) that is part of the vehicle 303a. Through the PAN it may be possible for either camera 310a in the vehicle 303a, or a camera 310b on the vehicle 303a to be have an indirect wireless connection with device associated with the target object or the target object itself. Though the external camera 310b is illustrated near the front of the vehicle 303a, it may be possible for the vehicle 303a to have one or more external camera(s) 310b mounted near the back or in the back of the vehicle 303a, as to see what devices or vehicles are behind the vehicle 303a. For example, the second device may be vehicle 303c.

An external camera 310b may aid in the selection, or as explained previously and below, GPS may also assist in the location of where the second device, such as the second vehicle 303c is located.

The relative location of the second device may be represented on the display device 319. The relative location of the second device may be based on receiving the location by one or more antennas 356. In another embodiment, a depth sensor 340, may be used to aid or determine the location of the second device. It may also be possible that other location detection technology (e.g. GPS) detecting the location of the second device, or, assisted GPS may be used to determine the relative location of the second device.

The representation of the relative location of the second device, may appear as a synthetic image, icon or other representation associated with the second device, such that a person in the vehicle 303a may make a selection of the second device through an eye gaze towards the representation on the display device 319, or gesture (pointing or touch) towards the representation on the display device 319.

The selection may also be through speech recognition and use one or more microphone(s) 360 located inside the vehicle 303a. As the second device is in communication with the vehicle 3030a, an audio signal may be received by the (first) vehicle 303a, by a transceiver mounted in or on the vehicle 303a, coupled to the one or more antennas 356.

It may be possible, for a driver or passenger of the first device to select the vehicle 303a in the back or the vehicle 303b in the front, and, establish a communication between the first device and either of these vehicles to initiate a virtual teleportation of one or more visual objects embedded in the virtual image that is teleported.

A person having ordinary skill in the art, also would appreciate that as advances in autonomous vehicles continue, the driver of the vehicle 303a may not actually be conducting (i.e., "driving") the vehicle 303a manually. Rather, the vehicle 303a may for some portion of time be self-driving.

Figure 3B:
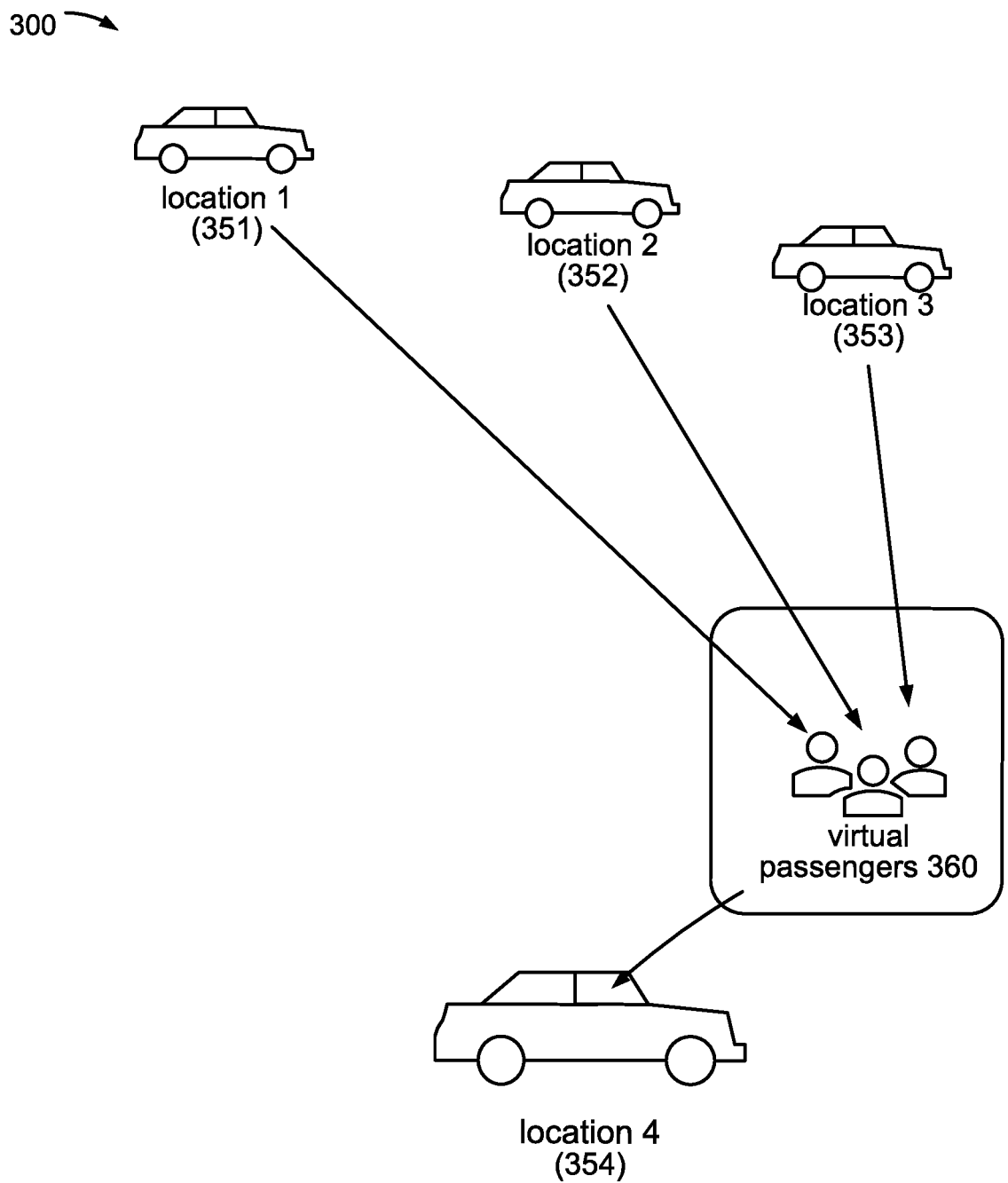
FIG. 3b illustrates a conceptual diagram of a virtual group talk experience across multiple vehicles that operate according to the techniques described in this disclosure.

FIG. 3b illustrates a conceptual diagram of a virtual group talk experience across multiple vehicles that operate according to the techniques described in this disclosure.

For example, at location 4 (354), a current vehicle may include a driver sitting in front of a digital display wearing a headset device that operates in accordance with the techniques described in this disclosure. A projection of one or more passenger(s), or example from a vehicle at location 1 (351) may be displayed on the digital display of the headset device at location 4 (354), or alternatively, projected on the windshield or in front of the windshield, with HUD technology described above (without the need for a headset device) in the vehicle at location 4 (354). In addition, other virtual passengers from other locations, for example, locations 2, and 3, where the different vehicles illustrated are at locations 2, and 3. Those different vehicles have the same ability to capture real passengers through the use of cameras within the vehicles of locations 2 and 3, or by sending personalized avatars and have them teleported to the current vehicle at location 4 (354).

The virtual images of the virtually teleported passengers 360 may each include either two-dimensional avatar data or three-dimensional avatar data. When a virtual passenger of the virtual passengers 360 speaks, it sounds as if the passenger is in the passenger seat or on a display device within the vehicle where the virtual image appears to physically be situated. That is, the virtual passenger may be coupled to a two-dimensional audio signal or three-dimensional audio signal. The two-dimensional audio signal or three-dimensional audio signal may include one or more audio objects (e.g., the person's voice) spatially located where the virtual image is perceived to physically be situated within the fixed environment. The loudspeakers that generate the two-dimensional or three-dimensional audio signal may be located in the current vehicle at location 4 (354), or, may be mounted and integrated into the headset device located within the vehicle of the current vehicle at the location 4.

In addition, the three-dimensional audio signal may be perceived as emanating from the direction from where the virtual image teleported from. Moreover, the audio signal may include a sound pattern during the teleportation of the virtual image, prior to the teleportation of the virtual image, or after the teleportation of the virtual image. The sound pattern may include tones or may be a pre-recorded sound.

For example, as the virtual teleportation is about to take place, an audio signal may include a sound pattern during the teleportation of the virtual image, that is prior to the teleportation of the virtual image that appears to be coming from the distance and angle selected of the target object. The sound pattern, prior to teleportation of the teleported object, may include tones or may be a pre-recorded sound.

Figure 3C:
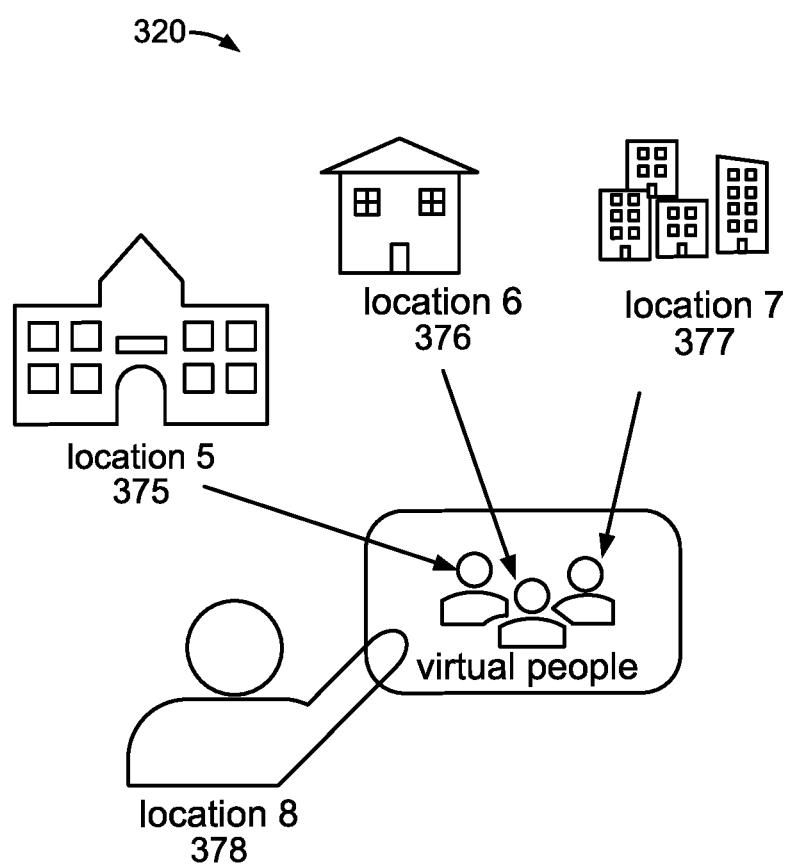
FIG. 3c illustrates a conceptual diagram of a virtual group experience across different physical entities that operate according to the techniques described in this disclosure.

FIG. 3c illustrates a conceptual diagram of a virtual group experience across different physical entities that operate according to the techniques described in this disclosure. Similar to FIG. 3b, FIG. 3c describes the fixed environments at different buildings.

For example, at location 8 (378), a current building may include a person sitting in front of a digital display wearing a headset device that operates in accordance with the techniques described in this disclosure. A projection of one or more person(s), from a building at location 5 (375) may be displayed on the digital display of the headset device, or alternatively, projected onto a projection screen, or mirror, or some a digital display device (without the need for a headset device). In addition, other virtual people from other locations, for example, locations 6, and 7, where the different buildings are illustrated are at locations 6, and 7. Those different buildings have the same ability to capture real world objects, e.g., people, through the use of cameras within the buildings or by sending personalized avatars scanned by three-dimensional scanners in the buildings and have the avatars or videos of the one or more people teleported to the current building at location 8 (378).

The virtual images of the virtually teleported people may each include either two-dimensional avatar data or three-dimensional avatar data. When the virtual passenger speaks, it sounds as if the passenger is in the passenger seat where the virtual image is. That is, the virtual passenger may be coupled to a two-dimensional audio signal or three-dimensional audio signal. The two-dimensional audio signal or three-dimensional audio signal may include one or more audio objects (e.g., the person's voice) spatially located where the virtual image appears to physically be situated within the fixed environment. The loudspeakers that generate the two-dimensional or three-dimensional audio signal may be located in the current building at location 5, or, may be mounted and integrated into the headset device.

In addition, the three-dimensional audio signal may be perceived as emanating from the direction from where the virtual image teleported from. Moreover, the audio signal may include a sound pattern during the teleportation of the virtual image, prior to the teleportation of the virtual image, or after the teleportation of the virtual image. For example, as the virtual teleportation is about to take place, an audio signal may include a sound pattern during the teleportation of the virtual image, that is prior to the teleportation of the virtual image that appears to be coming from the distance 420a and angle 420b (see FIG. 4b, FIG. 4c), selected of the target object. The sound pattern, prior to teleportation of the teleported object, may include tones or may be a pre-recorded sound.

Figure 4A:
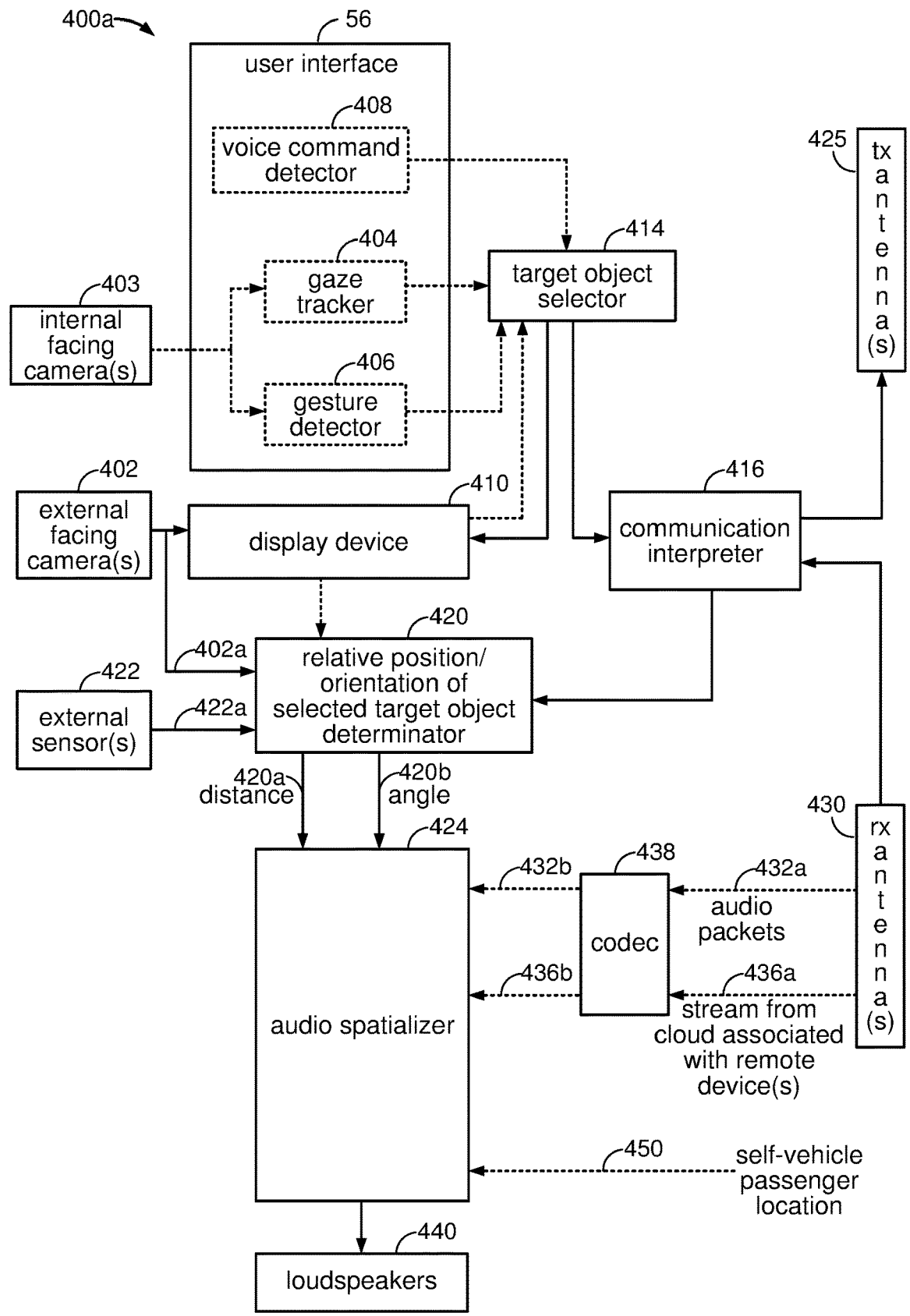
FIG. 4a illustrates a block diagram of a first device with different components on or in the first device that operate according to the techniques described in this disclosure.

FIG. 4a illustrates a block diagram 400a of a first device with different components on or in the first device that operate according to the techniques described in this disclosure. One or more of the different components may be integrated in one or more processors of the first device.

As illustrated in FIG. 4a, a vehicle may include a user interface unit 56. Previously, the user interface unit 56 was described in association with the in cabin of an autonomous vehicle. However, the user interface unit 56 may also be in a non-autonomous vehicle. The user interface unit 56 may include one or more of the following: a voice command detector 408, a gaze tracker 404, or a gesture detector 406. The user interface unit 56 may aid in the selection of a target object external to the first device.

The selection of a target object external to the device may aid in the transport of a virtual passenger based on a driver or other passenger in the first device (i.e., the first vehicle) selecting a target object. The target object may be a person is wearing a headset, or a second vehicle if the person is in the second vehicle. The person may be teleported as a "virtual passenger" into the first vehicle. In FIG. 4a, the driver or other person in the first vehicle may command a nearby second device to which initiate a communication with. That communication may be used to hear the virtual passenger based on the direction and angle of the second device, or, may be teleported into the first vehicle. The components in the user interface 56 may be integrated into one or more of the processors, or in other configurations (as illustrated in FIG. 4*a*) may be separately integrated into one or more processors. That is to say, one or more of the components: a voice command detector 408, a gaze tracker 404, or a gesture detector 406 may all be integrated into one processor, or may each reside in a separate processor, or a subset of the components may be integrated into different processors.

For example, selection of a target object external to the first device may be based on an eye gaze tracker 404 which detects and tracks where a wearer of a headset is looking or where a person 111 in a first vehicle is looking. When the target object is within the view of the person, the eye gaze tracker 404 may detect and track the eye gaze and aid in selecting the target object via the target object selector 414. Similarly, a gesture detector 406 coupled to one or more internal facing camera(s) 403 within the vehicle 303*a*, or mounted on a headset (not shown), may detect a gesture, e.g., pointing in the direction of the target object. In addition, a voice command detector 408 may aid in selecting the target object based on the person 111 uttering phrases as described above, e.g. "the black Honda Accord in front of me." The output of the voice command detector 408 may be used by the target object selector 414 to select the intended second device, e.g. vehicle 303*b* or 303*c*.

As mentioned previously, it may be possible for the vehicle 303*a* to have one or more external facing camera(s) 402 mounted near the back or in the back of the vehicle 303*a*, as to see what devices or vehicles are behind the vehicle 303*a*. For example, the second device may be a vehicle 303*c*.

The target object, e.g. the second device, may be represented relative to the first device based on features of an image, the image, or both the image and features of the image, wherein the image captured by one or more cameras, coupled to the first device.

An external 402 may aid in the selection of where the second vehicle 303*c* is located, e.g., in the back of the vehicle 303*a* (in other figures).

It is also possible that based on the one or more transmitter antennas 425 and possibly a depth sensor 340 (not shown in FIG. 4*a*), or other location detection technology (e.g. GPS) detecting the location of the second device, the relative location of the second device may be represented on the display device 410. The representation of the relative location of the second device, may appear as a synthetic image, icon or other representation associated with the second device, such that a person in the vehicle 303*a* may make a selection of the second device through an eye gaze towards the representation on the display device 410, or gesture (pointing or touch) towards the representation on the display device 410.

If the selection of the remote device, i.e., the second device is based on touch, the display device that includes the representation of the at least one target object to the external device (i.e., the first device) may be configured to select the at least one target object external to the device based on a capacitive sensor, or, ultrasound sensor on the display device changing state.

The first device may include one or more transmitter antennas 425, coupled to the one or more processors. The one or more processors of the first device, may be configured to send communication data to the second device based on the initiation, by the one or more processors, of the channel of communication between the first device and the second device associated with the at least one target object external to the first device. That is, after selection of the second device, one or more processors may initiate a protocol or other form of communication between the first device and second device, in a channel of communication between the first and second device using the C-V2X and/or V2X communications.

The selection may also be through speech recognition and use one or more microphone(s) (not shown in FIG. 4*a*) located inside the vehicle 303*a*. As the second device is in communication with the vehicle 3030*a*, an audio signal may be received by the (first) vehicle 303*a*, by one or more receiver antenna(s) 430 mounted in or on the vehicle 303*a*, coupled to a transceiver (e.g. a modem capable of V2X or C-V2X communications). That is to say, the one or more receive antenna(s) 430, coupled to the one or more processors, may be configured to receive the audio packets based on the result of the initiation of the channel of the communication between the at least one target object external (e.g., a second device) to the first device and the first device.

In addition, the first device may include one or more external facing camera(s) 402. The external facing camera(s) 402 may be mounted on the vehicle 303*a* may also aid in the selection of the target object itself (e.g., the vehicle 303*b*) or another device associated with a target object, if the target object is a person external to the vehicle 303*a*, or there is some other recognizable image associated with the vehicle 303*b*. The one or more external facing camera(s) may be coupled to the one or more processors which include a feature extractor (not shown) that may perform feature extraction on images on the display device 410. The extracted features alone, or in some configurations in conjunction with external sensor(s) 422 (e.g., the RADAR/LIDAR sensor(s)), may aid in the estimate of the relative position of the second device, (e.g., vehicle selected 303*b*).

The extracted features or the output of the external sensor(s) 422 may be input into a relative position/orientation of selected target object determinator 420. The relative position/orientation of selected target object determinator 420 may be integrated into one or more of the processors, and may be part of a tracker, or in other configurations (as illustrated in FIG. 4*a*) may be separately integrated into one or more processors. In FIG. 4*a*, the tracker 151 is not shown.

A distance 420*a* and angle 420*b* may be provided by the relative position/orientation of selected target object determinator 420. The distance 420*a* and angle 420*b* may be used by an audio spatializer 420 to output a three-dimensional audio signal that is based on a relative position of the second device. There may be at least two loudspeakers 440, coupled to the one or more processors that are configured to render the three-dimensional spatialized audio signal based on the relative position of the second device, or if there are multiple second devices, e.g., multiple vehicles, then the three-dimensional spatialized audio signal may be rendered as described above.

After a selection of the at least one target object external to the first device is performed by the target object selector 414, a command interpreter 416, integrated into one or more of the processors in the first device, a channel of communication between the first device and a second device associated with the at least one target object external to the first device. In response to the selection of at least one target object external to the first device audio packets may be received from a second device.

The audio packets 432a, from the second device, may be decoded, by the codec 438, to generate an audio signal. The audio signal may be output based on the selection of the at least one target object external to the first device. In some scenarios, the audio packets may represent a stream from cloud associated with remote devices (i.e., secondary devices) 436a. The codec 438 may decompress the audio packets and the audio spatializer may operate on uncompressed audio packets 432b or 436b. In other scenarios, the audio may be spatialized based on the passenger location of the person that made the selection of the secondary vehicle.

The codec may be integrated into one or more of the processors with another component illustrated in FIG. 4a (e.g., the audio spatializer 424), or in other configurations may be separately be integrated into a separate processor.

As such, a driver in a first device may select which vehicle to target to transport a virtual passenger from, e.g., the second device. While it may be possible to communicate with another passenger in the second device (e.g., a vehicle) without transporting a virtual representation of the other passenger "a virtual passenger" in the second vehicle, the driver of the first device may also initiate transporting the virtual passenger, as described in more detail in FIG. 4b and FIG. 4c.

The transmission of audio packets by an audio codec to be used may include one or more of the following: MPEG-2/AAC Stereo, MPEG-4 BSAC Stereo, Real Audio, SBC Bluetooth, WMA and WMA 10 Pro. As C-V2X and V2V systems may use data traffic channels or voice channels, the audio packets (may carry speech signals) and in may use one or more of the following codecs to decompress the audio signals: AMR Narrowband Speech Codec (5.15 kbp), AMR Wideband Speech Codec (8.85 Kbps), G.729AB Speech Codec (8 kbps), GSM-EFR Speech Codec (12.2 kbps), GSM-FR Speech Codec (13 kbps), GSM-HR speech Codec (5.6 kpbs), EVRC-NB, EVRC-WB, Enhanced Voice Services (EVS). A speech codec is sometimes called a vocoder. Before being sent over the air, the vocoder packet is inserted into a larger packet. Voice is transmitted in voice-channels, although voice can also be transmitted in data channels using VOIP (voice-over-IP). The codec 438 may represent a speech codec, an audio codec, or a combination of the functionality to decode speech packets or audio packets. In general, for ease of explanation, the term audio packet also includes the definition of packets.

The audio packets may be transmitted in conjunction with the virtual passenger, and, received metadata from the second device to the first device.

It is also possible that in one configuration that after the second vehicle is at a certain distance away from the first vehicle, the spatialization effect may be disabled.

The one or more processors included in the first device may be configured to disable a spatialization effect after the second vehicle is more than a configurable distance away from the first device. The certain distance may be configurable based on distance, e.g. an eighth of a mile. The configurable distance may be entered as a distance measurement or a time measurement. The certain distance may be configurable based on time, e.g., depending on the speed of the first and second vehicle. For example, instead of indicating that one eighth of a mile is the distance that the spatial effect should last, the distance between may be measured in terms of time. A vehicle traveling at 50 miles per hour (mph), one eighth of a mile is equivalent to 9 seconds, i.e., 125 mi/50 mi/hr=0.0025 hr=0.0025*60 min=0.15 min=9 seconds. Thus, after 9 seconds, in this example, the spatial effect may fade away or stop abruptly.

In an embodiment, the spatialization effect may also be disabled for teleportation if the second vehicle is at a certain distance away from the first vehicle. That is, a driver in the first vehicle may not be able to select a second vehicle and also initiate various aspects of teleportation. For example, as mentioned above, the audio signal may include a sound pattern during the teleportation of the virtual image, prior to the teleportation of the virtual image, or after the teleportation of the virtual image. In an embodiment, if the second vehicle is too far away, there may be a disabling of the loudspeakers rendering a sound pattern during the teleportation of the virtual passenger, prior to the teleportation of the virtual passenger, or after the teleportation of the virtual passenger.

Figure 4B:
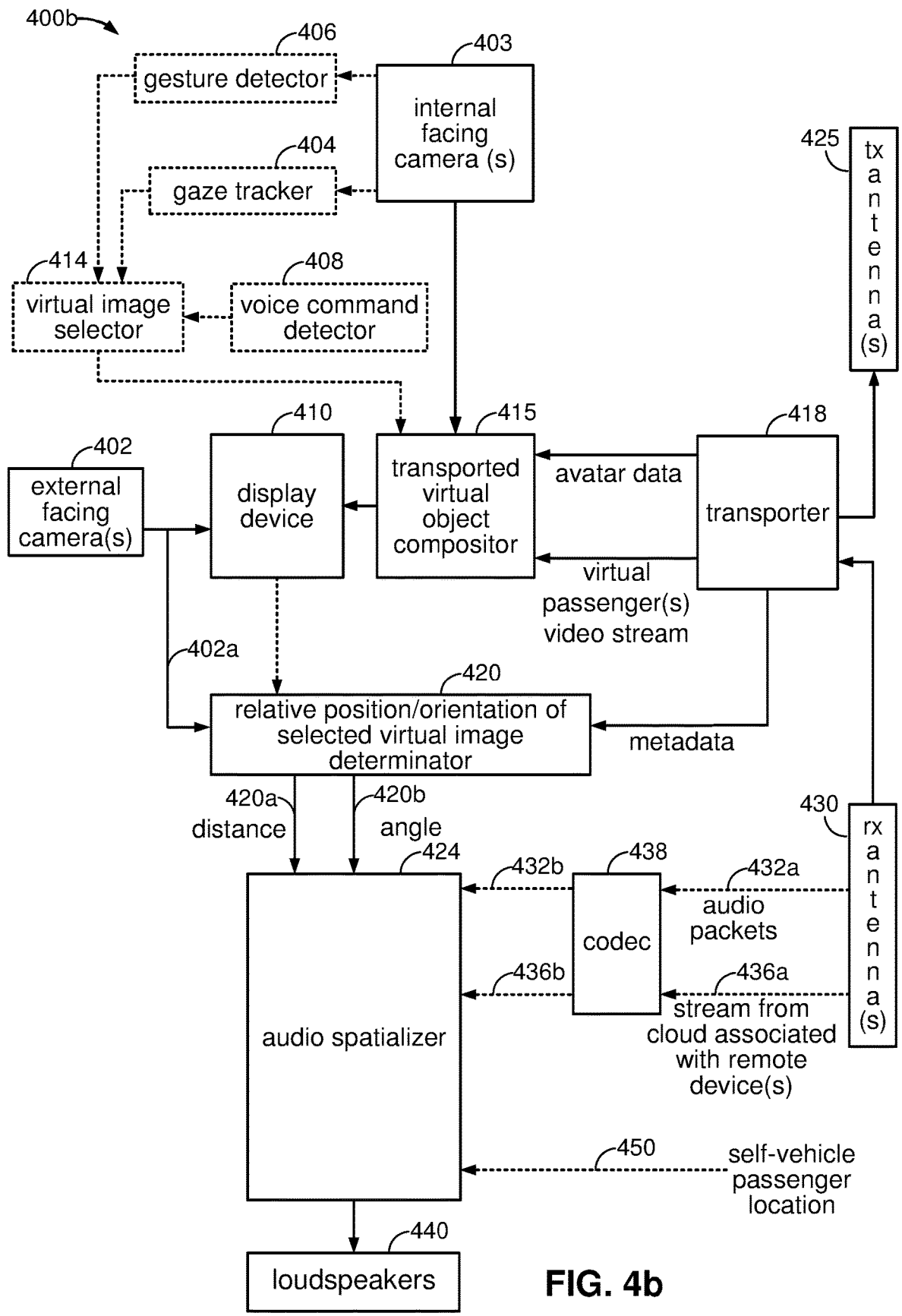
FIG. 4b illustrates a block diagram of a first device with different components on or in the first device that operate according to the techniques described in this disclosure.

FIG. 4b illustrates a block diagram 400b of a first device with different components on or in the first device that operate according to the techniques described in this disclosure. One or more of the different components may be integrated in one or more processors of the first device.

The block diagram 400b includes a transporter 418, and rx antenna(s) 430. Through the rx antenna(s) 430, one or more processors may be configured to receive metadata 435, from a second device, wirelessly connected via a sidelink channel to the first device. The one or more processors may use the metadata to identify the location of the virtual objects received directly, i.e., the coordinates of the virtual objects (either visual or audio) may be embedded in the metadata. In addition, or alternatively, the metadata may aid in the derivation of the relative position/orientation of selected target determinator 420, if as described in FIG. 4a, the driver or another passenger in a vehicle is selecting a virtual object by use of the target object selector 414.

The transporter 418 may output a video stream which is compressed (i.e., in the form of a bitstream) or uncompressed. A video codec is not shown, however, there may be one in either the display device 410, the transporter 418, the teleported virtual object compositor 415. Alternatively, there may be a video codec configured to uncompress the video stream if compressed. The video codec may be coupled to the transporter 418, or coupled to the teleported virtual object compositor 415, or coupled to the display device 415. The video stream may include a representation of a virtual passenger.

The video codec may be integrated into one or more of the processors with another component illustrated in FIG. 4b (e.g., the teleported virtual object compositor 415), or in other configurations may be separately be integrated into a separate processor. One or more of the transporter 418, teleported virtual object compositor 415, determinator 420, and video codec may each be integrated into a processor of the one or more processors, or in some configurations any combination of the components may be integrated into one processor of the one or more processors.

The output of the transporter 418 may be may also include virtual passenger avatar data. As discussed previously, the virtual images of the virtually teleported people may each include either two-dimensional avatar data or three-dimensional avatar data. The avatar data or the video stream may be input into the teleported virtual object compositor 415. The output of the teleported virtual object compositor 415 may be an augmented image that is represented on the display device. 410. The transporter 418 may be integrated into one or more processors. The teleported virtual object compositor 415 may be coupled to the transporter 418 and may also be integrated with the one or more processors. In some embodiments, the teleported virtual object compositor 415 may be integrated with the display device 410.

As discussed previously, when the virtual passenger speaks, it sounds as if the passenger is in the passenger seat where the virtual image is. That is, the virtual passenger may be coupled to a two-dimensional audio signal or three-dimensional audio signal. The two-dimensional audio signal or three-dimensional audio signal may include one or more audio objects (e.g., the person's voice) spatially located where the virtual image appears to physically be situated within the fixed environment. The loudspeakers 440 that generate the two-dimensional or three-dimensional audio signal may be located in the first device, e.g. a vehicle, or may be mounted and integrated into the headset device.

In addition, the three-dimensional audio signal may be perceived as emanating from the direction from where the virtual image teleported from. Moreover, the audio signal may include a sound pattern during the teleportation of the virtual image, prior to the teleportation of the virtual image, or after the teleportation of the virtual image. For example, as the virtual teleportation is about to take place, an audio signal may include a sound pattern during the teleportation of the virtual image, that is prior to the teleportation of the virtual image that appears to be coming from the distance 420a and angle 420b selected of the target object. The sound pattern, prior to teleportation of the teleported object, may include tones or may be a pre-recorded sound.

As discussed previously with respect to FIG. 4a, the first device may include a display device that is configured to represent the relative position of the second device.

The three-dimensional audio signal may be optionally generated by the audio spatializer 424, after audio packets 432a or 436a are decoded from the codec 438. In the same or alternative embodiment, the audio packets 432a associated with the virtual visual object embedded in the avatar data or the video stream, may be decoded from the codec 438. The codec 438 may implement the audio codecs or speech codecs described with respect to FIG. 4a. The one or more processors may be configured to output of a three-dimensional spatialized audio content based on where the relative position of the second device is represented on the display device 410. The output three-dimensional spatialized audio content may be rendered by two or more loudspeakers 440 that is coupled to the first device.

In some configurations, independent of whether the position of the second device is represented on the display device 410, the output of the audio signal associated with the audio object may be a three-dimensional spatialized audio signal that is based on the relative position of the second device. In other embodiments, the audio object may be a three-dimensional spatialized audio signal that is based on the coordinates included in metadata output from the transporter 418. The coordinates may include six degrees of freedom for the audio object. For example, there may be three degrees of freedom rotation of the virtual audio object in terms of yaw, pitch, and roll with respect to a fixed coordinate system. Similarly, the virtual object may take into account the three degrees of freedom relative to where the virtual visual objected is projected.

Figure 4C:
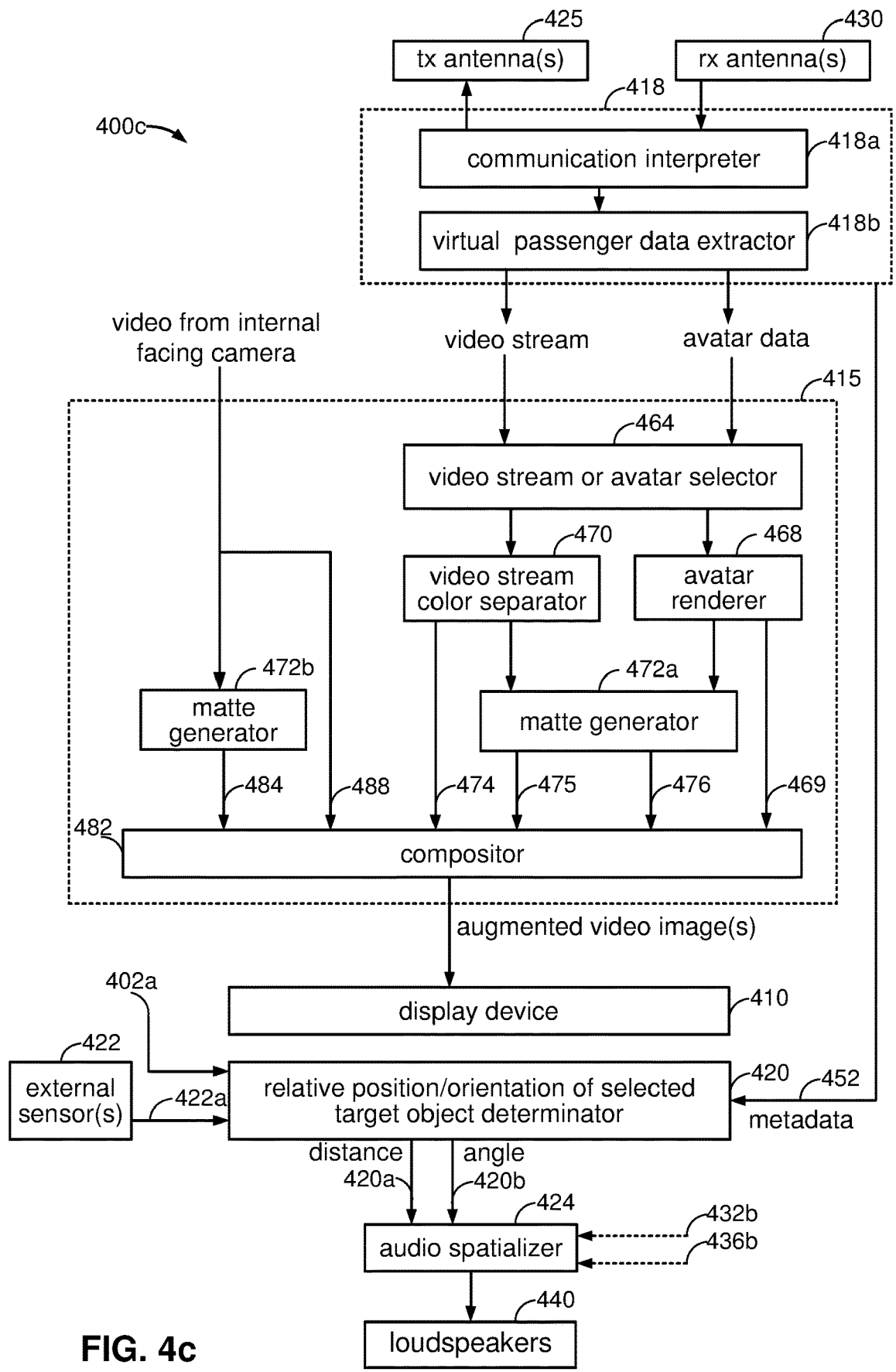
FIG. 4c illustrates a flow chart of an operation performed by a first device with different components on or in the first device that operate according to the techniques described in this disclosure.

FIG. 4c illustrates a block diagram 400c of a first device with different components on or in the first device that operate according to the techniques described in this disclosure. One or more of the different components may be integrated in one or more processors of the first device.

As illustrated video data may be generated by a camera coupled to a second device. For example, the second device for ease of illustration may be called device B. The visual environment behind a person using device B may also be captured by the camera coupled to the second device.

Alternatively, a person using device B may be represented by a two-dimensional (2D) or three-dimensional (3D) graphical representation. A 2D graphical representation may be an avatar. An avatar may be an animated cartoon character. The 3D graphical representation may be a 3D mathematical model representing the surface of the person using device B. The 3D model may be texture mapped for additional surface color and detail. The texture map allows for the wrapping of a two-dimensional image's pixels along the surface of a 3D model. The one or more receive antenna(s) 430 may be configured to receive messages from device B.

There may be a handshake or transport protocol between device the first device and device B, where messages are sent using one or more transmit antenna(s) 425 from the first device and device B. Similarly, there may be messages received with one or more receive antenna(s) 430 between the first device and device B. The handshake or transport protocol may include one or more messages indicating that one or more virtual objects, or images including one or more virtual objects are about to be teleported to the first device. For ease of explanation, the first device is referred to as device A. The communication interpreter 418a may receive messages from device B. Based on the message content, the communication interpreter 418a, may pass a packet to a data extractor 418b. The packet may include fields that include one or more bits that indicate the packet includes there is virtual passenger video stream and/or virtual passenger avatar data. The data extractor 418b may parse the packet and output virtual passenger video stream and/or virtual passenger avatar data. In some embodiments, the data extractor 418b is integrated into another block, including the communication interpreter 418a.

In an embodiment, there may be a video stream or avatar data selector 464. The selector 464 may output a video stream or avatar data. In addition, or alternatively, the selector 464 may output both the video stream and/or avatar data. There may be configurations in which a first device may not have a selector 464, and output either avatar data, video stream, or both avatar and video stream.

The avatar data may include motion attributes of the one or more virtual passengers. The motion attributes may be rendered, by an avatar renderer 468, as animation where a 3D model of the human's body parts may move. The avatar data may include a 3D model, the 2D texture map, and the animation information. The avatar data may be rendered to generate an image or a sequence of colored animated images of the virtual passenger. It should be understood of a person having ordinary skill in the art, that the virtual passenger may be any object, for, example, a virtual animal, or virtual, appliance, or cartoon. The sequence of color animated images may be referred to as vehicle B passenger color image.

In addition to color images, the avatar data may be rendered to generate one or more vehicle B passenger matte images, by using a matte generator 43a. The matte image may be used to combine two or more images together into a single final image. A matte image may be used to describe an area of interest in a color image. For example, the matte image of the vehicle B passenger color image, and the area of interest is the object, (e.g., person) received from vehicle B. The area of interest in the vehicle B passenger color image may have corresponding pixels that are colored white in the vehicle B passenger matte image. The other pixels in the vehicle B passenger matte image may be all colored black. The area of interest's border area and the rest of the vehicle B passenger matte image may have grey pixel values for a smooth transition between the white and black pixels.

The vehicle B passenger matte image may also be described as having transparency or alpha pixels. When described this way, black indicates transparency values, and white means opaque alpha values.

In addition, the one or more receive antenna(s) in vehicle A may be configured to receive video stream from the second device, e.g., vehicle B. The second device may include its own in-cabin video camera, or, may be coupled to a device that has a camera on it. In one embodiment, the received video stream, is output from the video stream or avatar selector 464, and the selector 464 passes the video stream to the video stream color separator 470. In an alternative embodiment, the received video stream passes directly to the video stream color separator 470. The video stream color separator generates a color image. The color image is input into the matte generator 472a. In an alternative embodiment, there may be a separate matte generator coupled to the video stream color separator 470, instead of shared between the vide stream color separator 470 and the avatar renderer 468.

The output image 475 of the matte generator 432a based on the video stream color image may be input into a compositor 482. Similarly, the output image 476 of the matte generator 432a based on the avatar renderer 468 may also be input into the compositor 482. The matte generator 432a may apply image segmentation in a region of interest to identify a person in the vehicle B and generate a vehicle B passenger matte image 474.

In an embodiment, the compositor 482 may combine the output image 474 of the matte generator 472a image with either the video stream color image, and, generate a composite image. In addition, or alternatively, the compositor 482 may combine the output image 469 of the matte generator 472a with the avatar rendered color image and generate a composite image. A composite image may be an augmented video image. The composite image may be based on a combination of both the avatar rendered color image and the video stream color image. Alternatively, the composite image may be based on the avatar rendered color image without the video stream image, or, be based on the video stream color image without the avatar rendered color image.

In addition, vehicle A may use internal facing camera(s) to capture in-cabin color video 428. Image segmentation techniques may be used to describe a region of interest in vehicle A. The single-color image from the in-cabin color video from the internal facing camera(s) 403 may be passed to a matte generator 473b and generate vehicle passenger matte image 484.

The compositor 482 may receive the vehicle B passenger color image (474, 469), and the corresponding vehicle B matte image (475, 476) and performs image composition with the vehicle A passenger color image 488, and the vehicle A matte image 484. The resulting augmented video image is a composite of a virtual object (e.g., the virtual passenger) placed in the proper context in vehicle A. For example, the virtual passenger in vehicle B may have a background where the seats are blue, but the seats and/or door surrounding the projected virtual passenger in vehicle A are brown. The virtual passenger's background including the blue seats may not appear in the composite image.

The compositor 482 may use an over operator compositing, where mathematically one image appears over another image. The composite image color may be determined by the following relationships:

$$C_{output} = C_{foreground} \pm C_{background}(1 - A_{foreground})$$

where: $C_{output}$ represents the pixel color of the output composite image;
 $C_{foreground}$ represents the pixel color of the foreground image,
 $C_{background}$ represents the pixel color of the background image;
 $A_{foreground}$ represents alpha (transparency) of the foreground image (i.e., the matte image).

The vehicle B passenger matte image, whether it is the matte image 475 based on the video stream 474, or the matte image 476 based on the avatar rendered color image 469, is based on the presence or absence of where the avatar exists.

Alternatively, to the techniques described above pertaining to matt generators 472a, 472b, matte generation may be done using a depth image to assist in image segmentation. A depth image is an image where every pixel describes the distance from the camera to that point in space. Objects close to a camera have small values or shallow depth. Objects far from camera have large depth. A virtual object (e.g., a person) in the image may have depth image pixel values that are similar and close to the camera, while non-person pixels may have very different values. The depth image may be created using two in-cabin depth video cameras (e.g., internal facing cameras). To generate depth from two cameras, a triangulation algorithm may be used to determine depth image pixel values using disparity. Disparity is the difference in image location of the same 3D point when projected under perspective to two different cameras. For example, the following relationships to compute a 3D point location may be used:

$$x = xl*(z/f) \text{ or } B + xr*z/f$$

$$y = yl*z/f \text{ or } yr*z/f$$

$$z = f*B/(xl - xr) = f*B/d$$

where:
f is the focal length;
B is the baseline;
D is the distance between the 2 cameras;
corresponding image points (xl, yl) of the left image and (xr, yr) of the right image.

In conjunction with other figures and descriptions herein, the blocks in FIG. 4c may enable one or more people in vehicle A to communicate with one or more people in vehicle B. There may be scenarios where a driver in vehicle A would like to speak with the driver or a passenger in vehicle B, and have a virtual object (i.e., the driver or passenger in vehicle B) be teleported to the front seat of vehicle A.

In an embodiment, vehicle A may not have a front seat passenger. As described in conjunction with FIG. 1c-FIG. 1h, the display device 410 may be incorporated and used in vehicle A in different configurations.

As an example, the driver of vehicle A may simply look to his or her right and speak with rendered view of another person from vehicle B. In some embodiments, the person from vehicle B, may have their head, shoulders, arm and left-side of body visible to the driver (or other passenger) in vehicle A.

It is also possible for the display device 410 to be used as a digital rear-view mirror in vehicle A (see FIG. 1e), which may allow for the driver of vehicle A to speak with a person in vehicle B. However, the one or more people in vehicle B may be projected into the backseat as reflected through the digital rear-view mirror in vehicle A. A person in vehicle B may be seated in any location in vehicle B, whether it is the front driver, front passenger, or rear passenger positions. The display device 410, may serve as a digital rear-view mirror. The display device 410 may be coupled to a camera mounted above the display device pointing towards the rear of the vehicle. The live video captured by the camera may be displayed on the display device 410. As with a physical mirror, when the driver looks in the rear-view mirror display, i.e., the display device 410, he/she may see part of his or her own face. Thus, virtual passengers that were teleported into vehicle A may be viewed as behind the driver in vehicle A.

To maintain the appropriate order of perspective and occlusion, the video stream, or, the avatar data output of the transporter 418 may be displayed on the display device 410, by having the passengers represented in the video stream or avatar data properly matted out using the silhouette of the vehicle A driver. The result is the vehicle A passenger matte image 484. Consequently, the virtual passengers may be properly composited foreground and background such that they appear behind the driver of vehicle A. The output of the compositor 482 may generate an augmented video stream that shows the virtual passengers from vehicle B along with any rear-view passenger from vehicle A.

In another embodiment, mixed reality, augmented reality or virtual reality wearable (e.g. glasses or HMD) may be used to place passengers, or a driver from vehicle B in any seat in vehicle A. For example, the orientation of the 3D coordinate system of the wearable may be initialized such that the 3D avatar appears to the right of the driver in vehicle A, and the rear passengers from vehicle B are located behind the driver of vehicle A.

There may be metadata that describes the spatial location and orientation of each of the virtual passengers that are being transmitted from vehicle B to vehicle A. Each packet of metadata may include a time stamp (e.g., an integer), and X, Y, Z positions as floating point numbers in three-dimensional space. Additionally, there may be rotation or orientation information, which may be expressed as Euler Rotations X, Y, Z, as three floating point numbers.

Alternatively, the rotation or orientation may be expressed as quaternion rotations of four floating point number describing angle and axis. There may be two integer numbers describing the position of each person in a car. A row number, with the front row representing the front row of the car with driver. A seat number, from left to right, representing the position of the passenger along a given row. Lastly, a boolean representing whether a given passenger is real or virtual. A real passenger is one who is physically sitting in a given car, while a virtual passenger is one that is recreated to sit in vehicle A, even though the person in physically sitting in vehicle B. The metadata may be used as input into the relative position/orientation of selected target object determinator 420 (see FIG. 4a). Alternatively, in an embodiment, the metadata may be input into the audio spatializer 424 and played through the loudspeakers 440.

Figure 5:
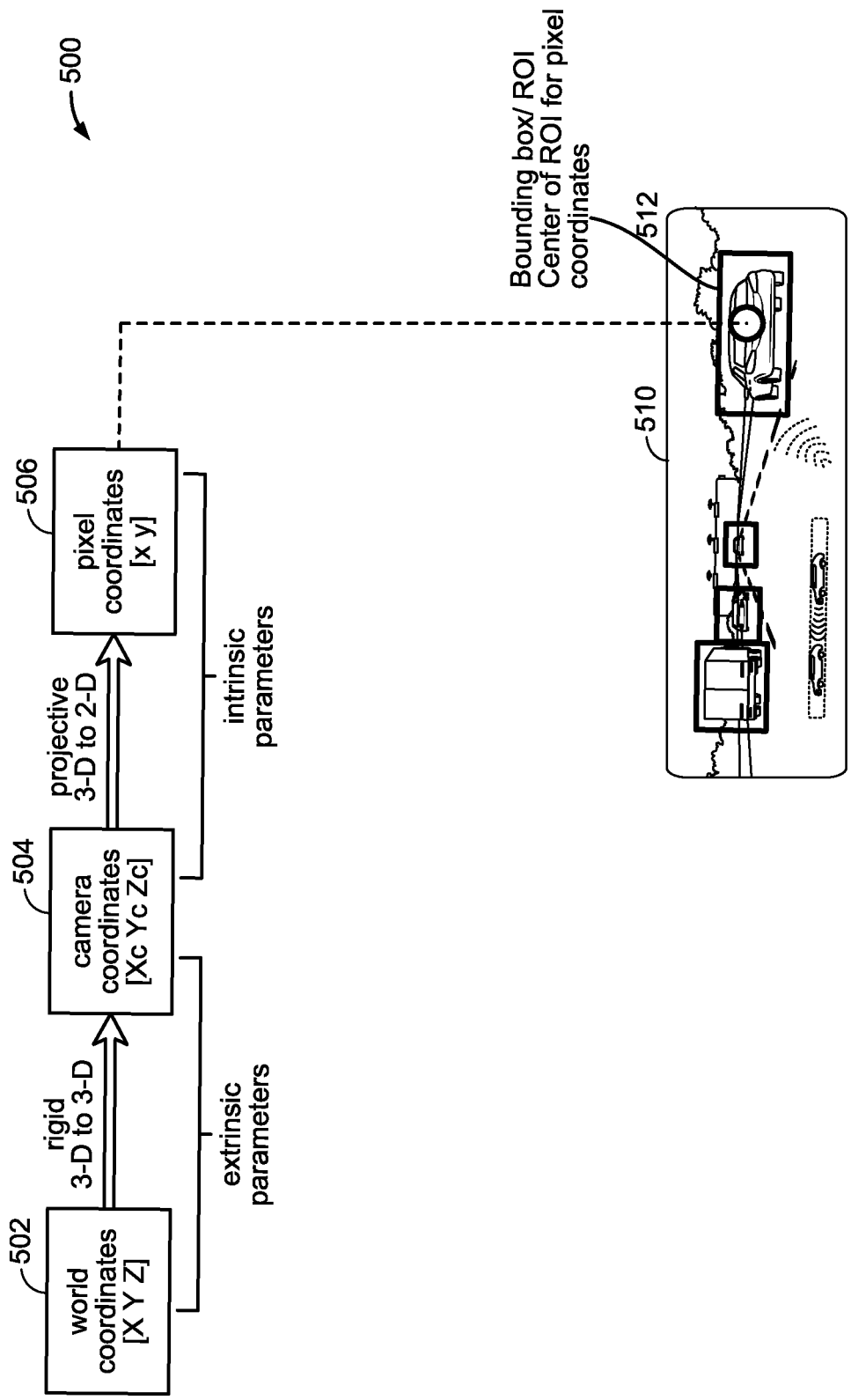
FIG. 5 illustrates a conceptual diagram of transformation of world coordinates to pixel coordinates according to the techniques described in this disclosure

FIG. 5 illustrates a conceptual diagram 500 of transformation of world coordinates to pixel coordinates according to the techniques described in this disclosure. An external camera mounted on a first vehicle (e.g., 310b in FIG. 3a, 402 in FIG. 4a), may capture images (e.g. video frames) and represent objects in the three-dimensional (3D) world coordinates [x, y, z] 502. The wold coordinates may be transformed into 3D camera coordinates [xc, yc, zc] 504. The 3D camera coordinates 504 may be projected into a 2D x-y plane (perpendicular to the direction normal vector of the face of the camera (310b, 402), and represent the objects of the images in pixel coordinates ($x_p, y_p$) 506. A person having ordinary skill in the art, would recognize that this transformation from world coordinates to pixel coordinates is based on transforming the world coordinates [x y z] using an input rotation matrix [R], a translation vector[t], and camera coordinates [$x_c, y_c, z_c$]. For example, the camera coordinates may be represented as [xc, yc, zc]=[x y z] *[R]+t, where the rotation matrix, [R], is a 3×3 matrix, and the translation vector, is a 1×3 vector.

A bounding box of a region of interest (ROI) may be represented in pixel coordinates ($x_p, y_p$) on a display device 510. There may be a visual designation (e.g. a color change or icon or synthetic pointer augmented inside the bounding box 512, to alert a passenger in the vehicle that the target object (e.g., the second vehicle) has been selected to initiate communication with.

Figure 6A:
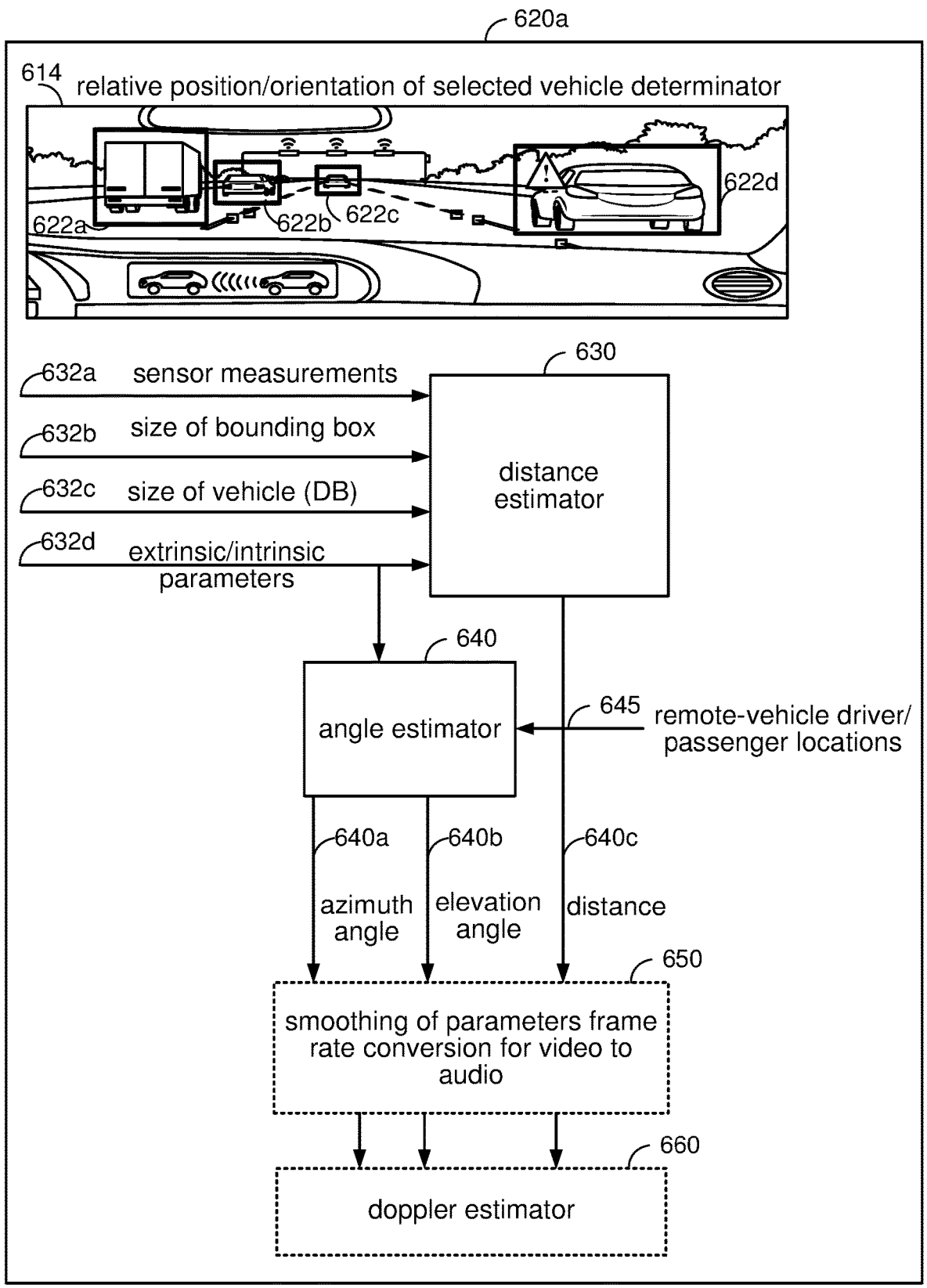
FIG. 6a illustrates a conceptual diagram of one embodiment of the estimation of distance and angle of a remote vehicle/passenger (e.g. a second vehicle).

FIG. 6a illustrates a conceptual diagram of one embodiment of the estimation of distance and angle of remote vehicle/passenger (e.g. a second vehicle). The distance may be derived from the bounding box 622d in a video frame. A distance estimator 630 may receive the sensor parameters 632a, intrinsic and extrinsic parameters 632d of the outward-looking camera (310b, 402) and the size 632b of the bounding box 622d. In some embodiments, there may be a vehicle information database which includes the size 632c of different vehicles and may also contain certain image characteristics that may aid in the identification of a vehicle.

The distance and angle parameters may be estimated at the video frame-rate and interpolated to match the audio frame-rate. From the database of vehicles, the actual size i.e. width and height of the remote vehicle may be obtained. The pixel coordinates ($x_p, y_p$) of a corner of the bounding box may correspond to a line in 3D world coordinates with a given azimuth and elevation.

Figure 6B:
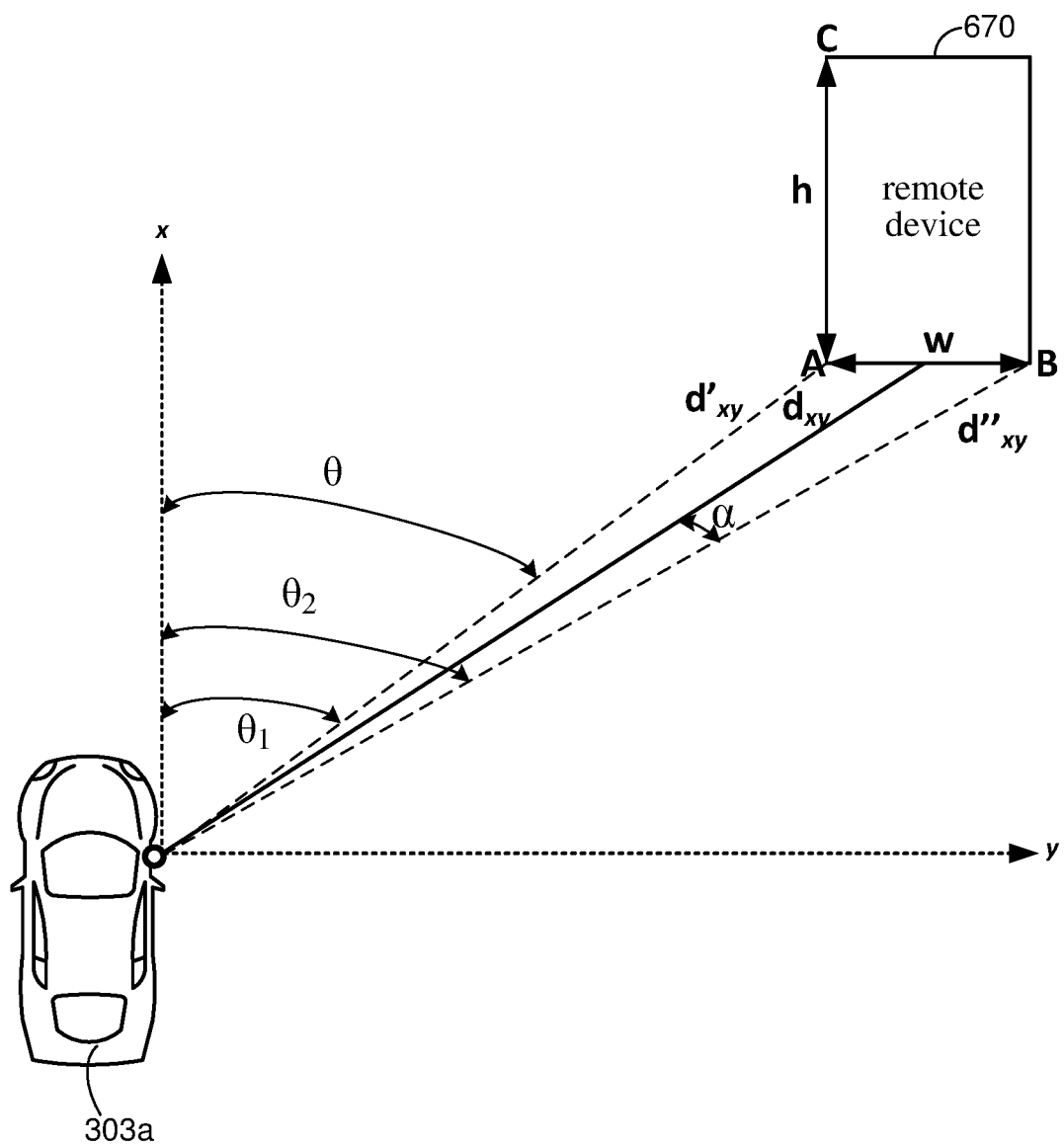
FIG. 6b illustrates a conceptual diagram of the estimation of distance and angle in the x-y plane of a remote device.

Using the left bottom corner and right bottom corner of the bounding box for example, and having the width of the vehicle, w, the distance 640c, d, and azimuth angle (Θ) 640a, may be estimated as shown in FIG. 6b.

FIG. 6b illustrates a conceptual diagram of the estimation of distance 640c and angle 640a in the x-y plane of a remote device.

Point A in FIG. 6b may be represented by world coordinates (a, b, c) Point B in FIG. 6b may also be represented by world coordinates (x, y, z). The azimuth angle (Θ) 640a may be represented as ($Θ_1+Θ_2$)/2. For small angles the distance $d_{xy}$*(sin $Θ_1$−sin $Θ_2$ is approximately w, which is the width of the remote device in FIG. 6b. The world coordinates (x, y, z) and (a, b, c) may be expressed in terms of the width in the x-y plane, for example using the following formulations:

$$x=a$$

$$ly-bl=w$$

$$z=c$$

The pixel coordinates described in FIG. 5 may be expressed as $x_p$=x=a and $y_p$=y=w+/−b.

Figure 6C:
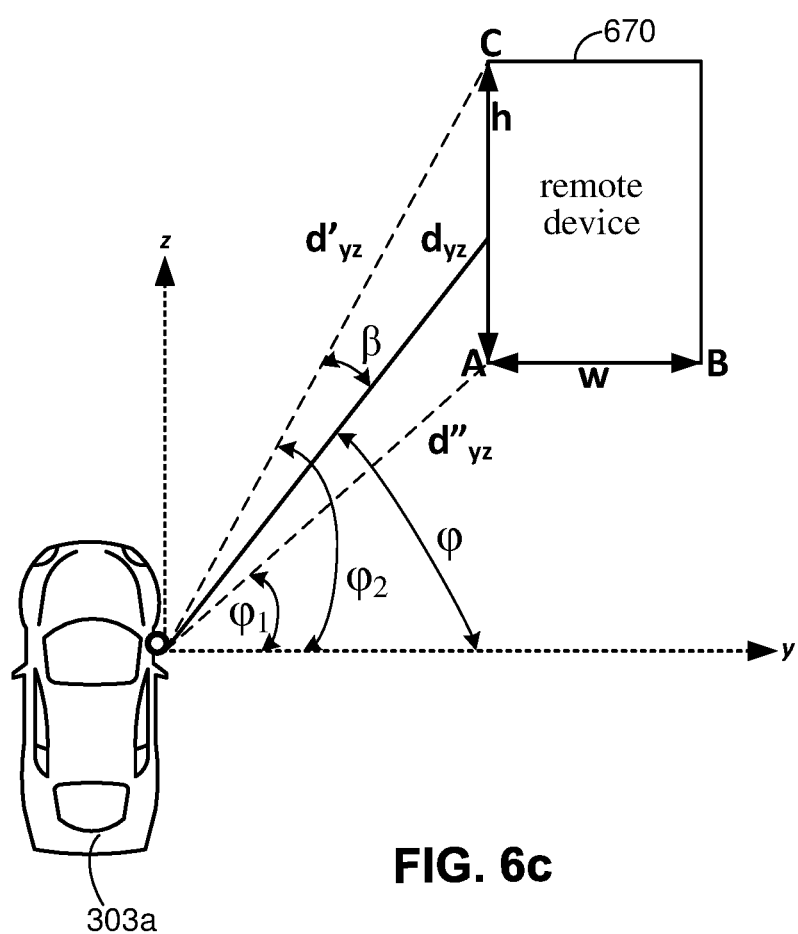
FIG. 6c illustrates a conceptual diagram of the estimation of distance and angle in the y-z plane of a remote device.

Similarly, using left bottom corner and left top corner of the bounding box and knowing the height h of the second vehicle 303b, the elevation angle (φ) 640b of the second vehicle 303b, and the second vehicle's distance $d_{yz}$ may be computed as shown in FIG. 6c.

FIG. 6c illustrates a conceptual diagram of the estimation of distance 640c and angle 640b in the y-z plane of a remote device.

Point A in FIG. 6c may be represented by world coordinates (a, b, c) Point B in FIG. 6c may also be represented by world coordinates (x, y, z). The elevation angle (φ) 640b may be represented as ($φ_1+φ_2$)/2. For small angles the distance $d_{yz}*(\sin \varphi_1 - \sin \varphi_2)$ is approximately h, which is the height of the remote device 670 in FIG. 6c. The world coordinates (x, y, z) and (a, b, c) may be expressed in terms of the height in the y-z plane, for example using the following formulations:

$$x=a$$

$$y=b$$

$$|z-c|=h$$

The pixel coordinates described in FIG. 5 may be expressed as $x_p = x = a$, and $y_p = y = b$.

Further adjustments to the elevation angle 640b and azimuth angle 640a may be made for sounds coming from the left half, the right half, or the middle of the remote device 670 depending on the location of the sound source. For example, if the remote device 670 is a remote vehicle (e.g., a second vehicle), the location of the sound source may depend on whether the driver is speaking, or the passenger is speaking. For example, the driver side (left) azimuth angle 640a for remote vehicle may be represented as $(3*\Theta_1+\Theta_2)/4$. This provides an azimuth angle 640a that is in the left half of the vehicle denoted in FIG. 8.

The video framerate typically does not match the audio framerate. To compensate for the misalignment of the framerates in different domains (audio and video), the parameters distance 640c, elevation angle 640b, φ, azimuth angle 640a, Θ, may be interpolated for each audio frame as a linear interpolation from the values corresponding to previous two video frames. Alternatively, the value from a recent video frame may be used (sample and hold). Furthermore, the values may be smoothed by taking the median (outlier rejection), or mean value from the past several video frame at the cost of decreased responsiveness.

The distance 640c, d, shown in FIG. 6a may be $d_{xy}$, or $d_{yz}$, or some combination of $d_{xy}$, and $d_{yz}$, e.g., the average. In some embodiments, it may be desirable to neglect the height difference between the first vehicle and the remote device 670, e.g., if the remote device 670 is at the same height of the first vehicle. Another example may be that the listener in the first vehicle configures settings to receive the spatial audio by projecting the z-component of the sound-field emanating from the remote device 670 projected into the x-y plane. In other examples, the remote device 670 may be a drone (e.g., flying around playing music) or there may be a device in a tall building that is streaming music. In such examples, it may be desirable to have the angle estimator 630 output an elevation angle 640b, or have the other optional blocks also operate on them. That is to say, have the smoothing of parameters frame rate conversion for video to audio 640 operate also on the elevation angle 640b, and produce a smoother version of the elevation angle 640b. As vehicles and/or remote devices will likely be moving around, the relative change in frequency of sounds may be accounted for by a doppler estimator 650. Thus, it may desirable for a listener in the first vehicle to additionally hear the sounds of the remote device 670, e.g. the second vehicle, with a doppler effect. The doppler estimator 650 may increase or decrease the change in frequency (i.e., the pitch) of that the listener in the first vehicle hears, as the remote device 670 gets closer or further away from the first vehicle. As the remote device 670 gets closer to the first vehicle, the sound if propagating through air reaches the listener as a higher frequency because the pressure wave of sound is compressed by the remote device approaching the first device. In the case where the audio signal (or audio content) is compressed and received as part of a radio-frequency signal, there is not a doppler shift that it perceptible by human hears. Thus, the doppler estimator 650 has to compensate and use the distance and angle to create the doppler effect. Similarly, when the remote device 670 is moving away from the first vehicle, a pressure sound wave of the audio signal (or audio content) would be expanded if propagating through air, and results in a lower-pitched sound. The doppler estimator 650 would compensate for what would be the lower frequency effect as the audio signal (or audio content) is compressed in a bitstream and also transmitted by the remote device and received by the first vehicle using radio-frequency waves according to a modulation scheme that is part of an air-interface for a C-V2X or V2x communication link. Or, if the remote device 670 is not a vehicle, a different type of communication link and air-interface may be used.

Figure 7A:
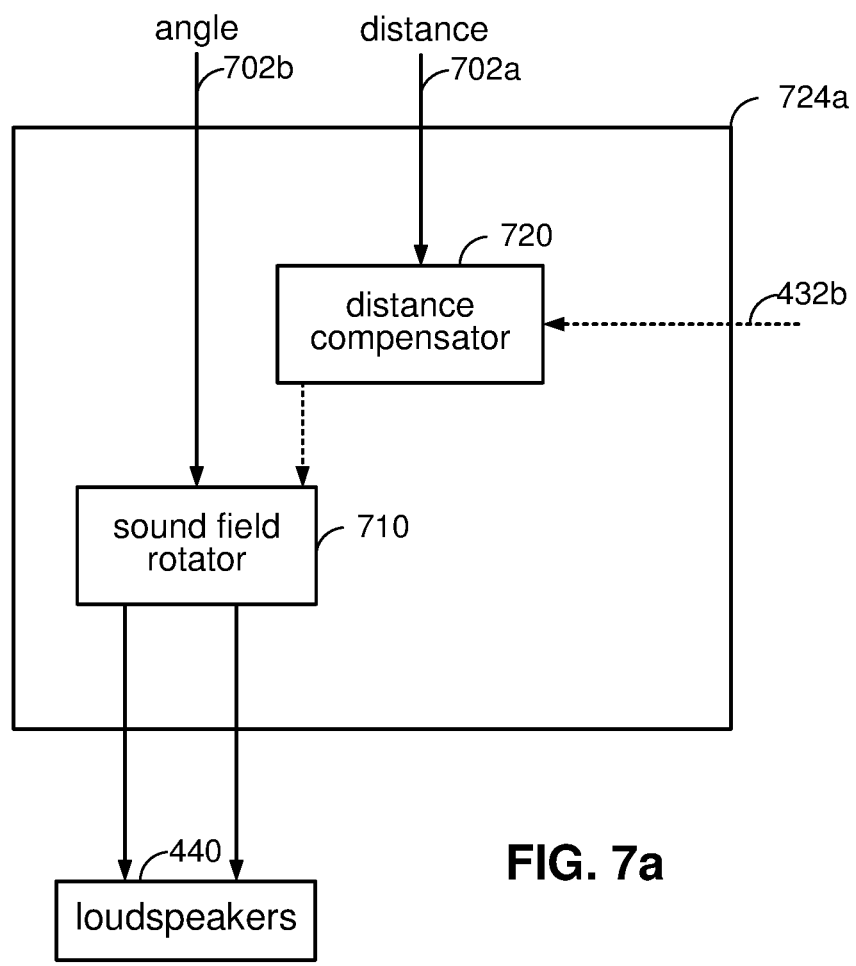
FIG. 7a illustrates an embodiment of an audio spatializer according to the techniques described in this disclosure.

FIG. 7a illustrates an embodiment of an audio spatializer 724a according to the techniques in this disclosure. In FIG. 7a, a reconstructed soundfield is rendered into loudspeaker feeds that are provided to loudspeakers 440 or headphones or any other audio delivery mechanism. The reconstructed soundfield may include spatial effects which were provided to account for the distance and azimuth/elevation of the device (e.g. a remote vehicle or wearable), relative to the person 111 in vehicle 303a (or another wearable).

A distance 702a (e.g. that comes out of distance estimator 630, parameters frame rate conversion for video to audio smoother 650, or doppler estimator 660) may be provided to a distance compensator 720. The input to the distance compensator 720 may be an audio signal (or audio content). The audio signal (or audio content) may be a the output of a codec 438. The codec 438 may output a pulse-coded-modulated audio signal. The PCM audio signal may be represented in the time domain or frequency domain. The distance effects may be added as a filtering process, finite impulse response (FIR), or Infinite Impulse Response (IIR) with an additional attenuation that is proportional to the distance (e.g., 1/distance may be the attenuation applied). An optional parameter (gain) may also be applied to turn up the gain for intelligibility. Moreover, reverberation filters are one example of distance simulator filters.

Another distance cue that may be modeled and added to the audio signal (or audio content) is the doppler effect described with respect to the doppler estimator 650 in FIG. 6c. The relative velocity of the remote vehicle is determined by computing the rate of change of distance per unit time, and the distance and angle is used to provide the doppler effect as described above.

Figure 7B:
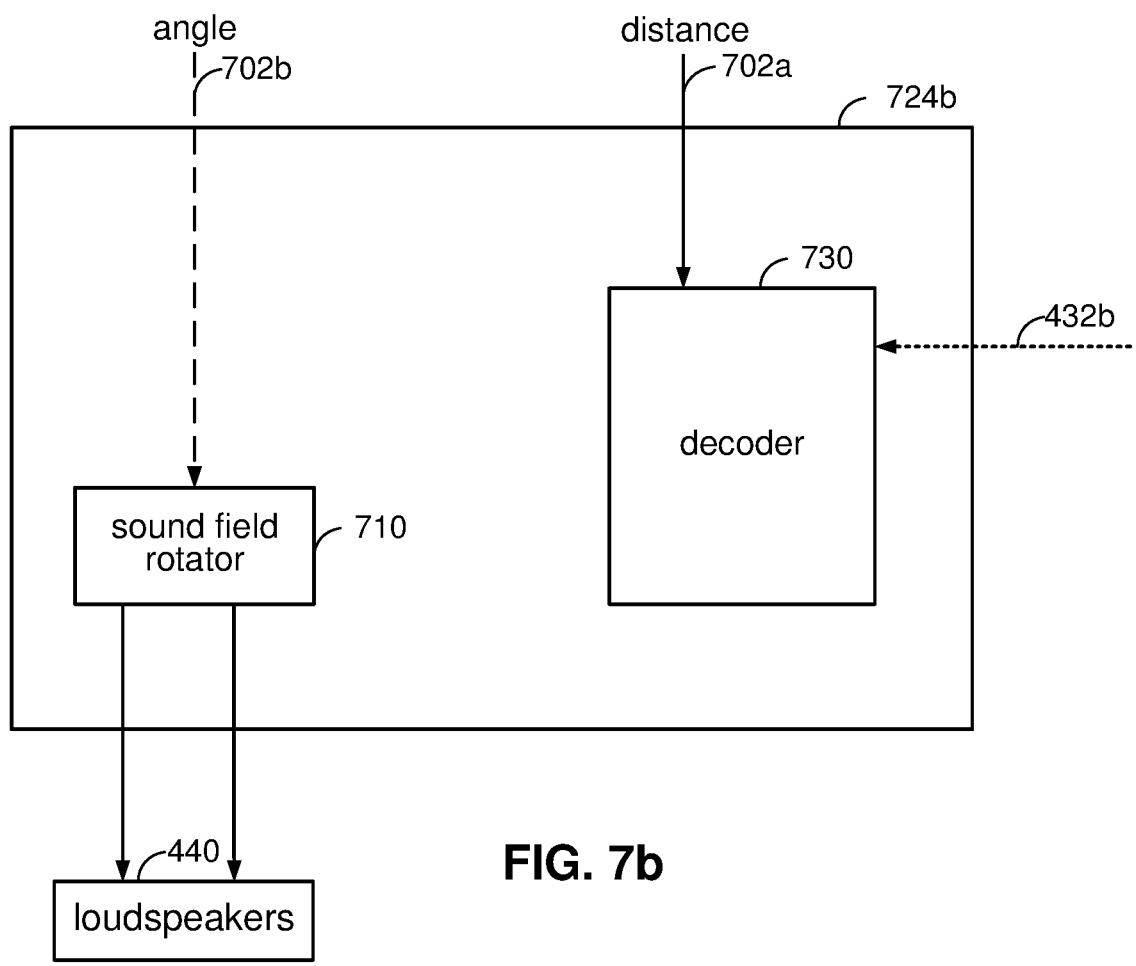
FIG. 7b illustrates an embodiment of an audio spatializer which includes a decoder used according to the techniques described in this disclosure.

The sound field rotator 710 may use the output of the distance compensator 720 and an input angle 702b (e.g., the azimuth angle 640a, elevation angle 640b, or a combination of based on these angles) and may pan the audio from the remote device (e.g., the second vehicle) to the intended azimuth angle and elevation angle. The input angle 720b may be converted to be output at an audio frame interval instead of a video frame interval by the smoothing of parameters frame rate conversion for video to audio 650. Another embodiment that may include a sound field rotator 710 without an inter-dependence to the distance is illustrated in FIG. 7b. The panning may be achieved among other means by using object-based rendering techniques such as vector-based amplitude panning (VBAP), ambisonics based renderers, or by using a high-resolution head-related transfer function (HRTF) for headphone based spatialization and rendering.

FIG. 7b illustrates an embodiment of an audio spatializer 424 which includes a decoder used according to the techniques described in this disclosure. In FIG. 7b, decoder 724b may utilize the distance 702a information in the decoding process. Additional distance effects may be applied as described in FIG. 7a. A decoder 730 may be configured to ignore the highest frequency bins when decoding for a distance larger than a certain threshold. The distance filters may smear out these higher frequencies and there may not be a need to maintain the highest fidelity in these frequency bins. In addition, a doppler shift may be applied in the frequency domain during the decoding process to provide a computationally efficient implementation of the doppler effect. Reverb and other distance filtering effects may also be efficiently implemented in the frequency domain and lend themselves to be integrated with the decoding process. During the decoding process, the rendering and/or binauralization may also be applied in the time domain or frequency domain within the decoder to result in the appropriately panned loudspeaker feeds at the output of the decoder.

The decoder 730 may be a speech decoder, or an audio decoder or a combined speech/audio decoder that is able to decode audio packets that include compressed speech and music. The input to the decoder 730 may be a stream from a cloud server associated with the remote device or remote devices. That is, there may be multiple streams as inputs 432b. The cloud server may include the streaming of music or other media. The input to the decoder 730 may also be compressed speech and/or music directly from the remote device (e.g., the remote vehicle).

Figure 8:
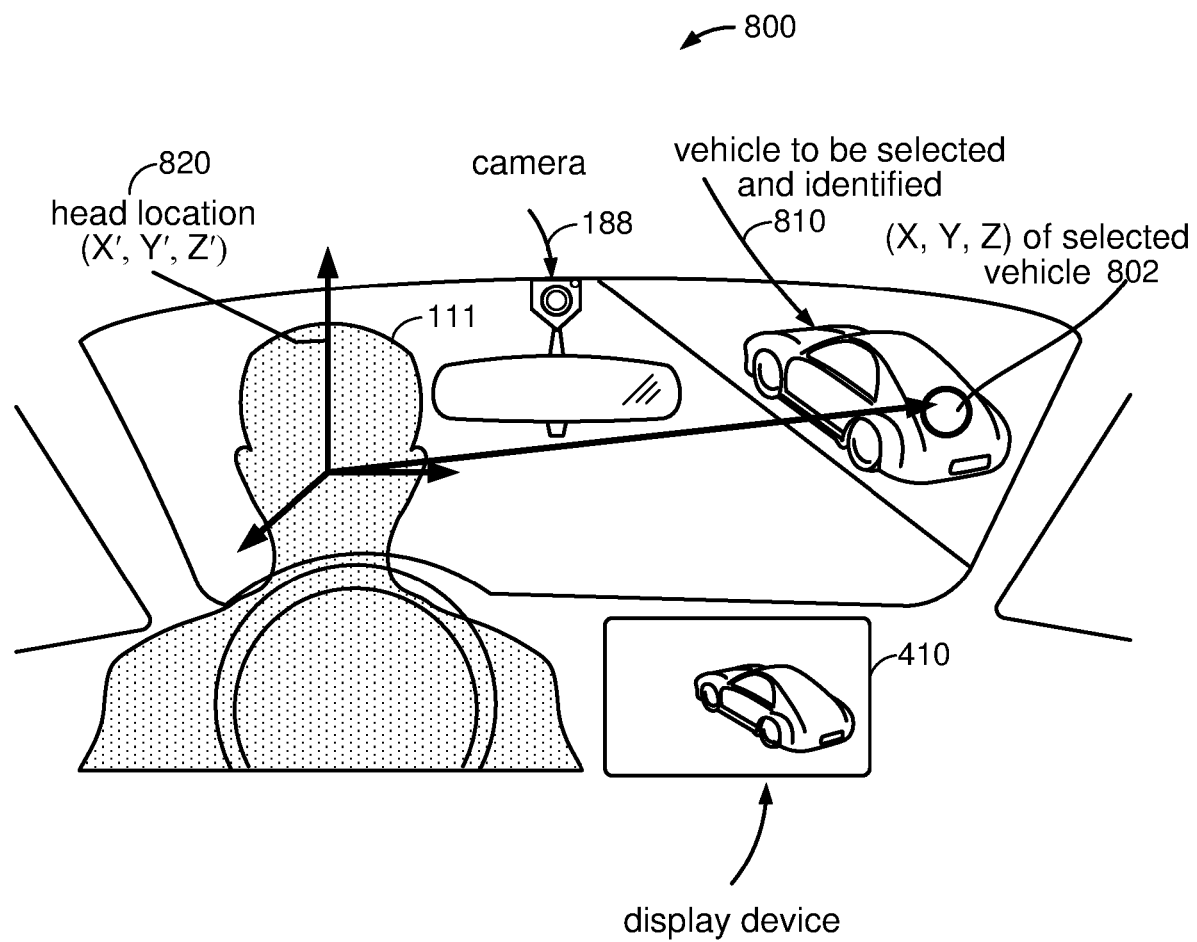
FIG. 8 illustrates an embodiment where the location of a person in a first vehicle and selected (remote) vehicle may be in the same coordinate system.

FIG. 8 describes an embodiment 800 where the location of the person 111 in the first vehicle and selected (remote) vehicle 810 may be in the same coordinate system. The angle and distance relative to the external camera previously described may need to be readjusted with respect to the head location 820 (X', Y', Z') of a person 111 in the first vehicle. The selected remote device (e.g. the remote vehicle 303b) location (X, Y, Z) 802 and the first vehicle 303a's location (X, Y, Z) may be computed from distance and azimuth/elevation angles as follows. X=d*cos(azimuth), Y=d*sin (azimuth) and Z=d*sin(elevation). The head location 820 from the inside facing camera 188 (of the first vehicle) may be determined and translated to the same coordinate system as the first vehicle's coordinates to obtain 820 X', Y' and Z'. Given X, Y, Z 802 and X', Y', Z' 820, the updated distance and angles relative to person 111 may be determined using trigonometric relationships. d=sqrt[(X-X')^2+(Y-Y')^2+(Z-Z')^2] and azimuth=a sin[(Y-Y')/d] and elevation=a sin[(Z-Z')/d]. These updated d and angles could be used for finer spatialization and distance resolution and better accuracy.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a device with computing capabilities.

A person having ordinary skill in the art would recognize that the one or more components in the device may be implemented in circuitry of a processor, one or more processor on in part or in whole as part of application specific integrated circuits (ASICs).

The program code, or instructions may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding or incorporated in a combined video encoder-decoder (CODEC).

The coding techniques discussed herein may be embodiment in an example video encoding and decoding system. A system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Particular implementations of the present disclosure are described below with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

As used herein, "integrated" may include "manufactured or sold devices." A device may be integrated if a user buys a package that bundles or includes the device as part of the package. In some descriptions, two devices may be coupled, but not necessarily integrated (e.g., different peripheral devices may not be integrated to a command device, but still may be "coupled"). Another example may be that any of the transceivers or antennas described herein that may be "coupled" to a processor, but not necessarily part of the package that includes a video device. Other examples may be inferred from the context disclosed herein, including this paragraph, when using the term "integrated".

As used herein "a wireless" connection between devices may be based on various wireless technologies, such as may be "wirelessly connected" based on different cellular communication systems, such as, V2X and C-V2X. C-V2X allows for direct communication (via a "sidelink channel") between a vehicle and other devices without the use of a base station. In such instances, the devices may be "wirelessly connected via a sidelink channel."

Long-Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1×, Evolution-Data Optimized (EVDO), Time Division Synchronous CDMA (TD-SCDMA), or some other version of CDMA. In addition, two devices may be wirelessly connected based on Bluetooth, Wireless-Fidelity (Wi-Fi), or variants of Wi-Fi (e.g., Wi-Fi Direct). When two devices are within line of sight, a "wireless connection" may also be based on other wireless technologies, such as ultrasound, infrared, pulse radio frequency electromagnetic energy, structured light, or directional of arrival techniques used in signal processing (e.g. audio signal processing or radio frequency processing).

As used herein A "and/or" B may mean that either "A and B," or "A or B," or both "A and B" and "A or B" are applicable or acceptable.

As used herein, a unit can include, for example, a special purpose hardwired circuitry, software and/or firmware in conjunction with programmable circuitry, or a combination thereof.

The term "computing device" is used generically herein to refer to any one or all of servers, personal computers, laptop computers, tablet computers, mobile devices, cellular telephones, smartbooks, ultrabooks, palm-top computers, personal data assistants (PDA's), wireless electronic mail receivers, multimedia Internet-enabled cellular telephones, Global Positioning System (GPS) receivers, wireless gaming controllers, and similar electronic devices which include a programmable processor and circuitry for wirelessly sending and/or receiving information.

Various examples have been described. These and other examples are within the scope of the following claims.

What is claimed is:

1. A first device configured to receive a communication signal from a second device, the first device comprising:
   one or more processors configured to:
      receive, in the communication signal, packets that represent a virtual image as part of a virtual teleportation of one or more visual objects embedded in the virtual image;
      decode the packets that represent the virtual image;
      output the virtual image at a physical location within a fixed environment;
      generate an audio signal wherein the audio signal includes a sound pattern, and wherein the sound pattern is a first sound pattern during the teleportation of the virtual image, and the sound pattern is a different sound pattern prior to, or after to, the teleportation of the virtual image; and
   a memory configured to store the packets that represent the virtual image as part of the virtual teleportation of one or more visual objects embedded in the virtual image.

2. The first device of claim 1, wherein the virtual image at the physical location within a fixed environment is rendered on a surface of a screen of a display device.

3. The first device of claim 2, further comprising the display device, wherein the display device is integrated into one of a headset device, a windshield in the first device, a tablet in the first device, a window in the first device, a digital rear view mirror in the first device, a table in the first device, and a mobile device in the first device.

4. The first device of claim 1 further comprising two or more loudspeakers configured to render the audio signal.

5. The first device of claim 4, wherein audio signal is a three-dimensional audio signal spatially located at an image plane of a display device.

6. The first device of claim 4, wherein the audio signal is a three-dimensional audio signal spatially located outside of an image plane of a display device.

7. The first device of claim 4, wherein the audio signal is a three-dimensional audio signal that includes one or more audio objects spatially located where the virtual image appears to be physically situated within the fixed environment.

8. The first device of 4, wherein the audio signal is a three-dimensional audio signal is perceived as emanating from the direction from where the virtual image teleported from.

9. The first device of claim 4, wherein the audio signal includes a sound pattern during the teleported of the virtual image, prior to the teleportation of the virtual image, or after the teleportation of the virtual image.

10. The first device of claim 1, wherein the virtual image is used to generate a matte image of one or more objects associated with the second device, wherein the matte image is based on combining the virtual image and an in-cabin image surrounding the physical location of where the virtual image is placed in the fixed environment.

11. The first device of claim 1, further comprising a heads-up display, wherein the heads-up display includes an optical combiner and a plurality of optical components configured to display the virtual image.

12. The first device of claim 11, wherein the heads-up display is integrated into a windshield of a vehicle and the virtual image is displayed on the windshield.

13. The first device of claim 11, wherein the heads-up display is physically separated from a windshield, and the virtual image is displayed in free space in a plane that is behind the windshield of the vehicle.

14. The first device of claim 1, further comprising a projector, wherein projector is configured to project the virtual image.

15. The first device of claim 14, wherein the projector is raised or lowered from within the cabin of a vehicle.

16. The first device of claim 1, wherein the virtual image includes either two-dimensional avatar data or three-dimensional avatar data.

17. The first device of claim 1, further comprising a display device configured to render the one or more visual objects embedded in the virtual image as part of a virtual teleportation.

18. A method for receiving, at a first device, a communication signal from a second device, the method comprising:
   receiving, in the communication signal, packets that represent a virtual image as part of a virtual teleportation of one or more visual objects embedded in the virtual image;
   storing the packets that represent the virtual image as part of the virtual teleportation of one or more visual objects embedded in the virtual image;
   decoding the packets that represent the virtual image;
   generating an audio signal wherein the audio signal includes a sound pattern, and wherein the sound pattern is a first sound pattern during the teleportation of the virtual image, and the sound pattern is a different sound pattern prior to, or after to, the teleportation of the virtual image; and
   outputting the virtual image at a physical location within a fixed environment.

19. The method of claim 18, wherein the virtual image at the physical location within the fixed environment is rendered on a surface of a screen of a display device in the first device.

20. The method of claim 18, further comprising rendering the audio signal.

21. The method of claim 20, wherein the audio signal is a three-dimensional audio signal, and the rendering of the three-dimensional audio-signal is performed with at least two or more loudspeakers included in the first device, spatially located at an image plane of a display device in the first device.

22. The method of claim 20 wherein the audio signal is a three-dimensional audio signal, the rendering of the three-dimensional audio signal is performed with at least two or more loudspeakers included in the first device, and the three-dimensional audio signal is spatially located outside of an image plane of a display device in the first device.

23. The method of claim 20, wherein the audio signal is a three-dimensional audio signal, the rendering of the three-dimensional audio signal is performed with at least two or more loudspeakers included in the first device, and the three-dimensional audio signal includes one or more audio objects spatially located where the virtual image appears to be physically situated within the fixed environment in the first device.

24. The method of claim 20 wherein the audio signal is three-dimensional audio signal, the rendering of the three-dimensional audio signal is performed with at least two or more loudspeakers included in the first device, and the three-dimensional audio signal is perceived as emanating from the direction from where the virtual image teleported from.

25. The method of claim 20, wherein the audio signal includes a sound pattern during the teleported of the virtual image, prior to the teleportation of the virtual image, or after the teleportation of the virtual image.

26. The method of claim 18, wherein the virtual image is used to generate a matte image of one or more objects associated with the second device, wherein the matte image is based on combining the virtual image and an in-cabin image surrounding the physical location of where the virtual image is placed in the fixed environment.

27. An apparatus for receiving, at a first device, a communication signal from a second device, the apparatus comprising:
   means for receiving, in the communication signal, packets that represent a virtual image as part of a virtual teleportation of one or more visual objects embedded in the virtual image;
   means for storing the packets that represent the virtual image as part of the virtual teleportation of one or more visual objects embedded in the virtual image;
   means for decoding the packets that represent the virtual image;
   means for generating an audio signal wherein the audio signal includes a sound pattern, and wherein the sound pattern is a first sound pattern during the teleportation of the virtual image, and the sound pattern is a different sound pattern prior to, or after to, the teleportation of the virtual image; and
   means for outputting the virtual image at a physical location within a fixed environment.

28. A non-transitory computer readable storage medium having stored thereon instructions that, when executed, cause a-one or more processors of a first device to:
   receive, in the communication signal, packets that represent a virtual image as part of a virtual teleportation of one or more visual objects embedded in the virtual image;
   store the packets that represent the virtual image as part of the virtual teleportation of one or more visual objects embedded in the virtual image;
   decode the packets that represent the virtual image;
   generate an audio signal wherein the audio signal includes a sound pattern, and wherein the sound pattern is a first sound pattern during the teleportation of the virtual image, and the sound pattern is a different sound pattern prior to, or after to, the teleportation of the virtual image; and
   output the virtual image at a physical location within a fixed environment.

29. A first device for receiving a communication signal from a second device, the first device comprising:
   one or more processors configured to:
      receive, in the communication signal, packets that represent a virtual image as part of a virtual teleportation of one or more visual objects embedded in the virtual image;
      decode the packets that represent the virtual image;
      output the virtual image at a physical location within a fixed environment; and
      generate an audio signal wherein the audio signal includes a sound pattern, and wherein the sound pattern is a first sound pattern prior to the teleportation of the virtual image, and the sound pattern is a different sound pattern after to, the teleportation of the virtual image; and
   a memory configured to store the packets that represent the virtual image as part of the virtual teleportation of one or more visual objects embedded in the virtual image.

* * * * *